United States Patent
Fischer et al.

(10) Patent No.: US 9,715,232 B1
(45) Date of Patent: Jul. 25, 2017

(54) USING PLANAR SENSORS FOR PALLET DETECTION

(71) Applicant: X Development LLC, Mountain View, CA (US)

(72) Inventors: Mark Fischer, Mountain View, CA (US); John Zevenbergen, Saratoga, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/268,984

(22) Filed: Sep. 19, 2016

(51) Int. Cl.
G06F 7/00 (2006.01)
G05D 1/02 (2006.01)
G01S 17/08 (2006.01)

(52) U.S. Cl.
CPC ............ G05D 1/0231 (2013.01); G01S 17/08 (2013.01); G05D 2201/0216 (2013.01); Y10S 901/01 (2013.01)

(58) Field of Classification Search
None
See application file for complete search history.

(56) References Cited

U.S. PATENT DOCUMENTS 4,747,610 A * 5/1988 Yingling ............... B62B 3/0612
180/271
4,957,408 A * 9/1990 Ohkura ..................... B66F 9/20
187/224
8,632,082 B2 * 1/2014 Lantz .................... B62B 3/0612
187/222
9,487,356 B1 * 11/2016 Aggarwal ............ B65G 1/1373

OTHER PUBLICATIONS

Roger Bostelman et al., Visualization of Pallets, SPIE Optics East 2006 Conference, Oct. 1-4, 2006, 12 pgs., Boston, MA.
Matthew R. Walter et al., Closed-loop Pallet Manipulation in Unstructured Environments, Institute of Electrical and Electronics Engineers/Robotics Society of Japan, 2010, 8 pgs., Taipei, Taiwan.
Seth Teller et al., A Voice-Commandable Robotic Forklift Working Alongside Humans in Minimally-Prepared Outdoor Environments, IEEE International Conference on Robotics and Automation (ICRA), May 2010, Anchorage, AK.
N. Bellomo et al., Pallet Pose Estimation with LIDAR and Vision for Autonomous Forklifts, 13th IFAC Symposium on Information Control Problems in Manufacturing, Jun. 3-5, 2009, Moscow, Russia.

* cited by examiner

*Primary Examiner* — Yolanda Cumbess
(74) *Attorney, Agent, or Firm* — McDonnell Boehnen Hulbert & Berghoff LLP

(57) ABSTRACT

Example implementations may relate to a mobile robotic device that is operable to detect pallets using a distance sensor. According to these implementations, the robotic device causes the distance sensor to scan a horizontal coverage plane in an environment of the robotic device. Then, the robotic device receives from the distance sensor, sensor data indicative of the horizontal coverage plane. The robotic device compares the sensor data to a pallet identification signature. Based on the comparison, the robotic device detects a pallet located in the environment. Further, based on the sensor data, the robotic device determines a location and an orientation of the detected pallet.

20 Claims, 12 Drawing Sheets

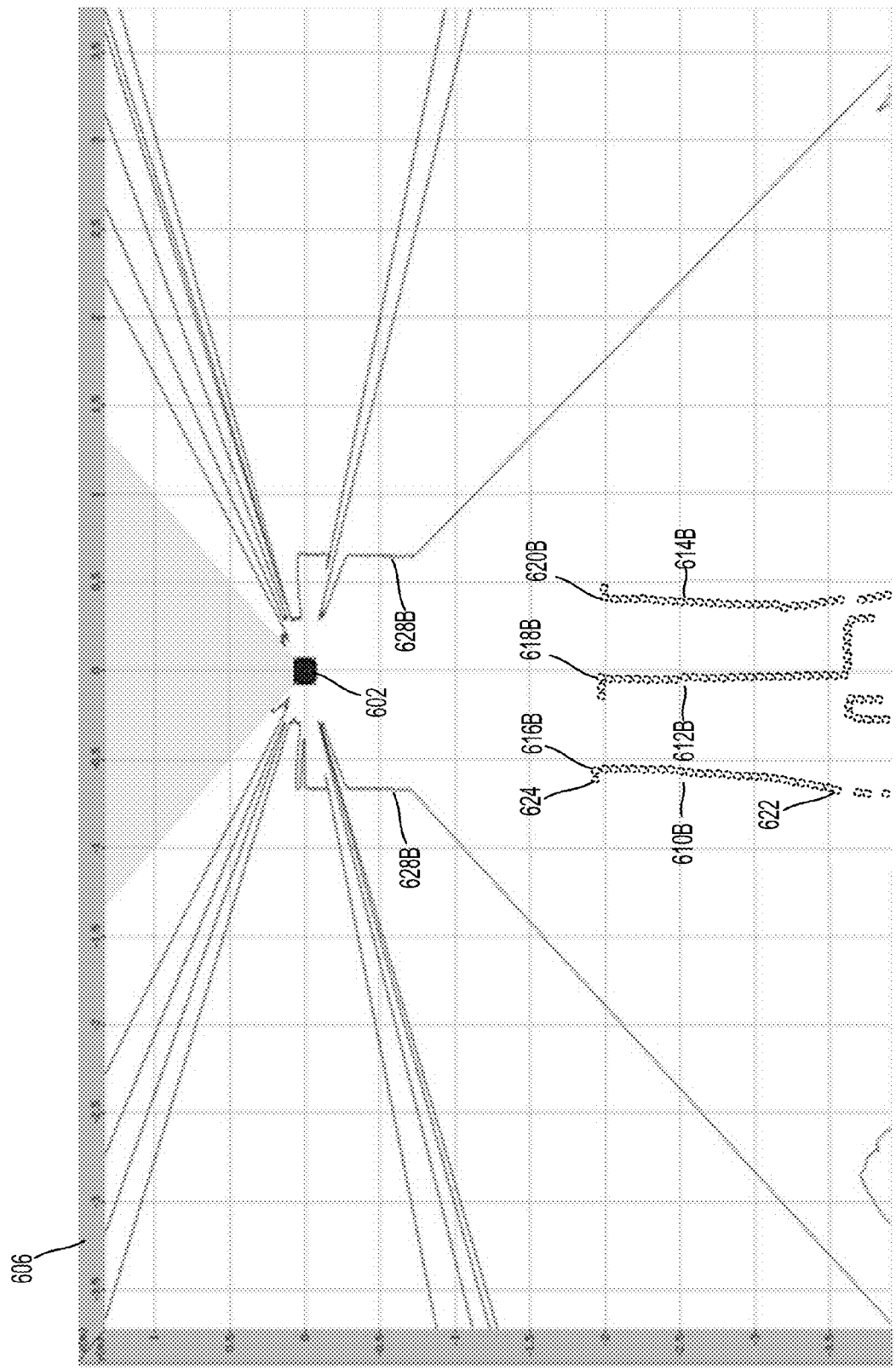

USING PLANAR SENSORS FOR PALLET DETECTION

BACKGROUND

A warehouse may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storages of pallets, flat transport structures that contain stacks of boxes or other objects. Additionally, the warehouse may use machines or vehicles for lifting and moving goods or pallets of goods, such as cranes and forklifts. Human operators may be employed to operate machines, vehicles, and other equipment. In some cases, one or more of the machines or vehicles may be robotic devices guided by computer control systems.

SUMMARY

According to an example implementation, a mobile robotic device may include one or more distance sensors. Moreover, the mobile robotic device may be configured to cause the one or more distance sensors to scan an environment in which the robotic device is located to produce sensor data. The sensor data may be indicative of a two-dimensional (2D) representation of the environment. Specifically, the sensor data may indicate distances to detect surfaces of objects in the environment. A control system of the robotic device may analyze the data in order to detect objects in the environment. In an embodiment, the control system may compare the data to pallet signatures in order to detect any pallets that may be located in the environment. Using pallet signatures may help the control system precisely determine the location and orientation of any detected pallet. As such, the control system may provide the robotic device with specific instructions in order for the robotic device to accurately interact with or manipulate the pallet.

In one aspect, a method is provided. The method involves causing, by a control system, a distance sensor coupled to a robotic device to scan a horizontal coverage plane in an environment of the robotic device. The method also involves receiving, by the control system from the distance sensor, first sensor data indicative of the horizontal coverage plane. The method additionally involves comparing, by the control system, the first sensor data to a pallet identification signature, where the pallet identification signature is indicative of two dimensions of a support member of a pallet type. The method further involves based on the comparison, detecting, by the control system, a pallet located in the environment. The method yet further involves based on the first sensor data, determining, by the control system, a location and an orientation of the detected pallet.

In another aspect, a mobile robotic device is provided. The mobile robotic device includes a distance sensor coupled to a robotic device, two tines, and a control system. The control system is operable to cause the distance sensor coupled to a robotic device to scan a horizontal coverage plane in an environment of the robotic device. The control system is also operable to receive from the distance sensor, first sensor data indicative of the horizontal coverage plane. The control system is additionally operable to compare the first sensor data to a pallet identification signature, where each pallet identification signature is indicative of two dimensions of at least one support member of a pallet type. The control system is further operable to, based on the comparison, detect a pallet located in the environment. The control system is yet further operable to, based on the first sensor data, determine a location and orientation of the detected pallet.

In yet another aspect, a non-transitory computer readable medium is provided. The non-transitory computer readable medium has stored therein instructions executable by one or more processors to cause a mobile robotic device to perform functions. In particular, the functions involve causing a distance sensor coupled to a robotic device to scan a horizontal coverage plane in an environment of the robotic device. Additionally, the functions involve receiving from the distance sensor, first sensor data indicative of the horizontal coverage plane. Further, the functions involve comparing the first sensor data to a pallet identification signature, where the pallet identification signature is indicative of two dimensions of a support member of a pallet type. Further, the functions include based on the comparison, detecting a pallet located in the environment. Yet further the functions include based on the first sensor data, determining a location and an orientation of the detected pallet.

In yet another aspect, a system is provided. The system may include means for causing, by a control system, a distance sensor coupled to a robotic device to scan a horizontal coverage plane in an environment of the robotic device. The system may also include means for receiving, by the control system from the distance sensor, first sensor data indicative of the horizontal coverage plane. The system may additionally include means for, comparing, by the control system, the first sensor data to a pallet identification signature, where each pallet identification signature is indicative of two dimensions of a support member of a pallet type. The system may further include means for based on the comparison, detecting, by the control system, a pallet located in the environment. The system may yet further include means for based on the first sensor data, determining, by the control system, a location and orientation of the detected pallet.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIG. 6B shows two-dimensional distance sensor data, according to an example implementation.

DETAILED DESCRIPTION

Figure 1A:
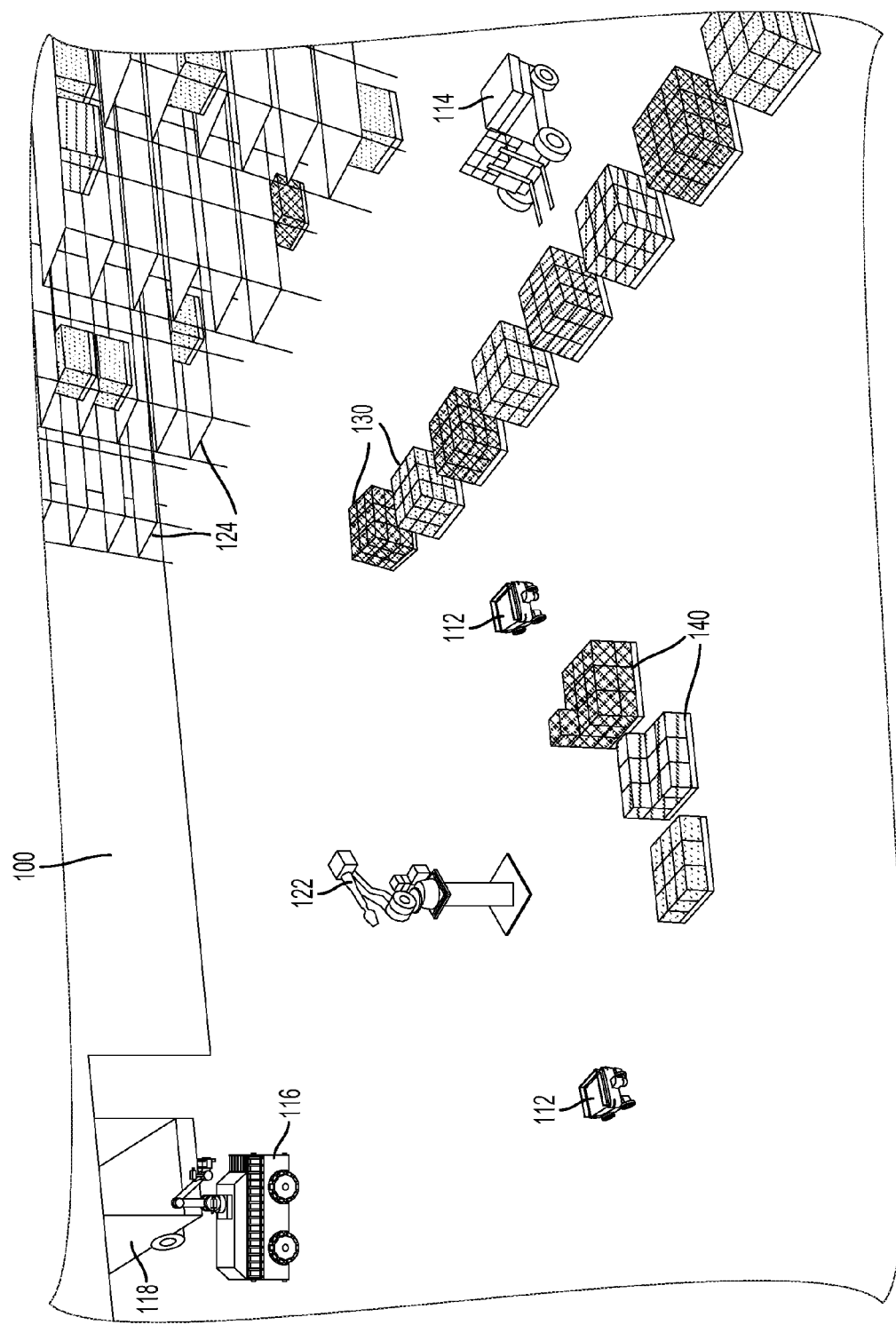
FIG. 1A shows a robotic fleet, according to an example implementation.

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

Example implementations may relate to methods and systems for detecting pallets located in an environment by using one or more distance sensors, such as distance sensors configured to collect two-dimensional (2D) planar distance measurements. In particular, a mobile robotic device such as a fork truck may be deployed in a warehouse in which pallets are stored. The fork truck may be deployed in the warehouse in order to move pallets that are located in the warehouse. However, in order to move a pallet, the fork truck may first need to precisely locate the pallet in the warehouse. Further, the fork truck may need to determine the orientation of the pallet in order to locate pallet tine pockets in which the fork truck may insert its tines to lift the pallet.

In practice, various methods may be used to determine the location of a pallet. For example, the environment may be highly structured environment in which the fork truck may have knowledge of the precise location of pallets in the warehouse. In such an environment, the fork truck may receive instructions to pick up a pallet that is stored in a specific area that is known to the fork truck. In other examples, the fork truck may rely on three-dimensional (3D) sensors to generate a three-dimensional (3D) representation of the warehouse, and may use the generated 3D representation of the warehouse to attempt to locate a pallet.

Such solutions, however, may have shortcomings that may make it difficult to accurately determine a location and orientation of a pallet in an environment. For instance, maintaining a highly structured environment is logistically difficult, especially in a dynamic environment such as a warehouse. Further, it may be advantageous to deploy a fork truck in any worksite, including worksites that are not highly structured, and have the robotic device locate and move pallets. Other solutions, such as 3D sensors, can be prohibitively expensive, which may make it difficult to implement such solutions in a large number of fork trucks.

In an example embodiment, a mobile robotic device may include one or more planar distance sensors that can be used to detect pallets in an environment. The one or more planar distance sensors may output two-dimensional sensor data that is indicative of a horizontal coverage plane in the environment. In particular, the mobile robotic device travelling within an environment may use the one or more distance sensors to collect horizontal distance measurements that specify respective distances between the sensor and various points on surfaces in the environment. A control system of the mobile robotic device may use the sensor data to detect a pallet in the environment.

More specifically, the control system of the mobile robotic device may analyze the sensor data, and then compare the sensor data to various pallet identification signatures in order to detect sensor data that is indicative of a pallet in the environment. A pallet identification signature may be indicative of a two-dimensional representation of one or more identifiable features of a pallet, such as a support member of the pallet. Accordingly, the control system may analyze the sensor data in order to detect patterns in the data that may correspond to the features of the pallet. The control system may then compare the detected patterns to the various identification signatures in order to determine whether the detected patterns correspond to a pallet. The pallet identification signature may also be indicative of a pallet type. Thus, by determining a signature that corresponds to the detected patterns in the data, the control system may determine the pallet type of the detected pallet. Given that a pallet type may have standard dimensions and design, a control system may determine the dimensions and the location of the features in the detected pallet based on the pallet type.

Furthermore, as the sensor data is indicative of distances to points on objects, the control system may precisely determine the location and/or the orientation of the detected pallet based on the location of the detected feature patterns in the environment. For example, the control system may use the pattern location and the pallet type to determine a six degree-of-freedom (DOF) pose of the pallet. By precisely determining the location and orientation of the pallet, the control system may determine where to position the robotic device in order to manipulate the detected pallet. Subsequently, the control system may operate the robotic device in order to position the robotic device at the determined location in order to manipulate the pallet.

II. EXAMPLE WAREHOUSE ENVIRONMENT

Example implementations may involve a robotic fleet deployed within a warehouse environment. More specifically, a combination of fixed and mobile components may be deployed within the environment to facilitate automated processing of boxes, packages, or other types of objects. Example systems may involve automated loading and/or unloading of boxes and/or other objects, such as into storage containers or to and from delivery vehicles. In some example implementations, boxes or objects may be automatically organized and placed onto pallets. Within examples, automating the process of loading/unloading trucks and/or the process of creating pallets from objects for easier storage within a warehouse and/or for transport to and from the warehouse may provide a number of industrial and business advantages.

According to various implementations, automating the process of loading and/or unloading delivery trucks at the warehouse and/or the process of creating pallets may include the deployment of one or more different types of robotic devices to move objects or perform other functions. In some implementations, some of the robotic devices can be made mobile by coupling with a wheeled base, a holonomic base (e.g., a base that can move in any direction), or rails on the ceiling, walls, or floors. In additional implementations, some of the robotic devices may be made fixed within the environment as well. For instance, robotic manipulators can be positioned on elevated bases at different chosen locations within a warehouse.

As used herein, the term "warehouse" may refer to any physical environment in which boxes or objects may be manipulated, processed, and/or stored by robotic devices. In some examples, a warehouse may be a single physical building or structure, which may additionally contain certain fixed components, such as pallet racks for storing pallets of objects. In other examples, some fixed components may be installed or otherwise positioned within the environment before or during object processing. In additional examples, a warehouse may include multiple separate physical structures, and/or may also include physical spaces that are not covered by a physical structure as well.

Further, the term "boxes" may refer to any object or item that can be placed onto a pallet or loaded onto or unloaded from a truck or container. For example, in addition to rectangular solids, "boxes" can refer to cans, drums, tires or any other "simple" shaped geometric items. Additionally, "boxes" may refer to totes, bins, or other types of containers which may contain one or more items for transport or storage. For instance, plastic storage totes, fiberglass trays, or steel bins may be moved or otherwise manipulated by robots within a warehouse. Examples herein may also be applied toward objects other than boxes as well, and toward objects of various sizes and shapes. Additionally, "loading" and "unloading" can each be used to imply the other. For instance, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet. In addition, the terms "palletizing" and "depalletizing" can each be used to imply the other.

Within examples, a heterogeneous warehouse robot fleet may be used for a number of different applications. One possible application includes order fulfillment (e.g., for individual customers), in which cases may be opened and individual items from the cases may be put into packaging within boxes to fulfill individual orders. Another possible application includes distribution (e.g., to stores or other warehouses), in which mixed pallets may be constructed containing groups of different types of products to ship to stores. A further possible application includes cross-docking, which may involve transporting between shipping containers without storing anything (e.g., items may be moved from four 40-foot trailers and loaded into three lighter tractor trailers, and could also be palletized). Numerous other applications are also possible.

Referring now to the figures, FIG. 1A depicts a robotic fleet within a warehouse setting, according to an example implementation. More specifically, different types of robotic devices may form a heterogeneous robotic fleet 100 that may be controlled to collaborate to perform tasks related to the processing of items, objects, or boxes within a warehouse environment. Certain example types and numbers of different robotic devices are shown here for illustration purposes, but robotic fleet 100 may employ more or fewer robotic devices, may omit certain types shown here, and may also include other types of robotic devices not explicitly shown. Additionally, a warehouse environment is shown here with certain types of fixed components and structures, but other types, numbers, and placements of fixed components and structures may be used in other examples as well.

One example type of robotic device shown within robotic fleet 100 is an autonomous guided vehicle (AGV) 112, which may be a relatively small, mobile device with wheels that may function to transport individual packages, cases, or totes from one location to another within the warehouse. Another example type of robotic device is an autonomous fork truck 114, a mobile device with a forklift that may be used to transport pallets of boxes and/or to lift pallets of boxes (e.g., to place the pallets onto a rack for storage). An additional example type of robotic device is a robotic truck loader/unloader 116, a mobile device with a robotic manipulator as well as other components such as sensors to facilitate loading and/or unloading boxes onto and/or off of trucks or other vehicles. For instance, robotic truck unloader 116 may be used to load boxes onto delivery truck 118, which may be parked adjacent to the warehouse. In some examples, movements of delivery truck 118 (e.g., to deliver packages to another warehouse) may also be coordinated with robotic devices within the fleet.

Other types of mobile devices than those illustrated here may also be included as well or instead. In some examples, one or more robotic devices may use different modes of transportation besides wheels on the ground. For instance, one or more robotic devices may be airborne (e.g., quadcopters), and may be used for tasks such as moving objects or collecting sensor data of the environment.

In further examples, the robotic fleet 100 may also include various fixed components that may be positioned within the warehouse. In some examples, one or more fixed robotic devices may be used to move or otherwise process boxes. For instance, a pedestal robot 122 may include a robotic arm elevated on a pedestal that is fixed to the ground floor within the warehouse. The pedestal robot 122 may be controlled to distribute boxes between other robots and/or to stack and unstack pallets of boxes. For example, the pedestal robot 122 may pick up and move boxes from nearby pallets 140 and distribute the boxes to individual AGV's 112 for transportation to other locations within the warehouse.

In additional examples, robotic fleet 100 may employ additional fixed components positioned within a warehouse space. For instance, high density storage racks 124 may be used to store pallets and/or objects within the warehouse. The storage racks 124 may be designed and positioned to facilitate interaction with one or more robotic devices within the fleet, such as autonomous fork truck 114. In further examples, certain ground space may be selected and used for storage of pallets or boxes as well or instead. For instance, pallets 130 may be positioned within the warehouse environment at chosen locations for certain periods of time to allow the pallets to be picked up, distributed, or otherwise processed by one or more of the robotic devices.

Figure 1B:
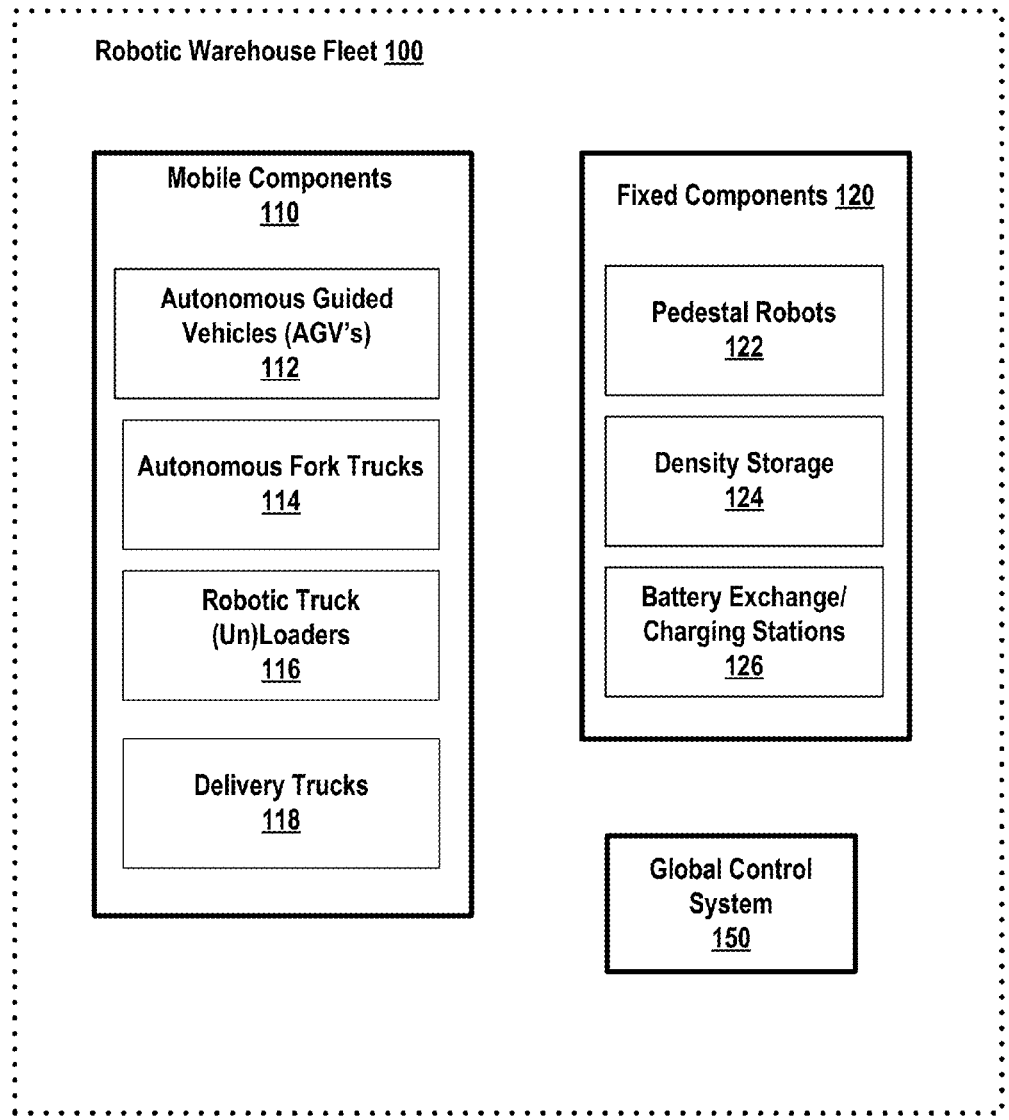
FIG. 1B is a functional block diagram illustrating components of a robotic fleet, according to an example implementation.

FIG. 1B is a functional block diagram illustrating components of a robotic warehouse fleet 100, according to an example implementation. The robotic fleet 100 could include one or more of various mobile components, such as AGV's 112, autonomous fork trucks 114, robotic truck loaders/unloaders 116, and delivery trucks 118. The robotic fleet 100 may additionally include one or more fixed components positioned within a warehouse or other environment, such as pedestal robots 122, density storage containers 124, and battery exchange/charging stations 126. In further examples, different numbers and types of the components illustrated within FIG. 1B may be included within a fleet, certain types may be omitted, and additional functional and/or physical components may be added to the examples illustrated by FIGS. 1A and 1B as well. To coordinate actions of separate components, a global control system 150, such as a remote, cloud-based server system, may communicate (e.g., through wireless communication) with some or all of the system components and/or with separate local control systems of individual components.

Within examples, certain of the fixed components 120 may be installed before deployment of the rest of the robotic fleet 100. In some examples, one or more mobile robots may be brought in to map a space before determining placement of certain fixed components 120, such as the pedestal robots 122 or battery exchange stations 126. Once map information is available, the system may determine (e.g., by running simulations) how to layout the fixed components within the space available. In certain cases, a layout may be chosen to minimize the number of fixed components needed and/or the amount of space used by those components. The fixed components 120 and mobile components 110 may be deployed in separate stages or all at once. In additional examples, certain of the mobile components 110 may only be brought in during particular time periods or to complete particular tasks.

In some examples, global control system 150 may include a central planning system that assigns tasks to different robotic devices within fleet 100. The central planning system may employ various scheduling algorithms to determine which devices will complete which tasks at which times. For instance, an auction type system may be used in which individual robots bid on different tasks, and the central planning system may assign tasks to robots to minimize overall costs. In additional examples, the central planning system may optimize across one or more different resources, such as time, space, or energy utilization. In further examples, a planning or scheduling system may also incorporate particular aspects of the geometry and physics of box picking, packing, or storing.

Planning control may also be distributed across individual system components. For example, global control system 150 may issue instructions according to a global system plan, and individual system components may also operate according to separate local plans. Additionally, different levels of detail may be included within a global plan, with other aspects left for individual robotic devices to plan locally. For instance, mobile robotic devices may be assigned target destinations by a global planner but the full routes to reach those target destinations may be planned or modified locally.

In additional examples, a central planning system may be used in conjunction with local vision on individual robotic devices to coordinate functions of robots within robotic fleet 100. For instance, a central planning system may be used to get robots relatively close to where they need to go. However, it may be difficult for the central planning system to command robots with millimeter precision, unless the robots are bolted to rails or other measured components are used to precisely control robot positions. Local vision and planning for individual robotic devices may therefore be used to allow for elasticity between different robotic devices. A general planner may be used to get a robot close to a target location, at which point local vision of the robot may take over. In some examples, most robotic functions may be position-controlled to get the robots relatively close to target locations, and then vision and handshakes may be used when needed for local control.

In further examples, visual handshakes may enable two robots to identify one another by AR tag or other characteristics, and to perform collaborative operations within fleet 100. In additional examples, items (e.g., packages to be shipped) may be provided with visual tags as well or instead, which may be used by robotic devices to perform operations on the items using local vision control. In particular, the tags may be used to facilitate manipulation of the items by the robotic devices. For instance, one or more tags on particular locations on a pallet may be used to inform a fork lift where or how to lift up the pallet.

In additional examples, deployment and/or planning strategies for fixed and/or mobile components may be optimized over time. For instance, a cloud-based server system may incorporate data and information from individual robots within the fleet and/or from external sources. Strategies may then be refined over time to enable the fleet to use less space, less time, less power, less electricity, or to optimize across other variables. In some examples, optimizations may span across multiple warehouses, possibly including other warehouses with robotic fleets and/or traditional warehouses. For instance, global control system 150 may incorporate information about delivery vehicles and transit times between facilities into central planning.

In some examples, a central planning system may sometimes fail, such as when a robot gets stuck or when packages get dropped in a location and lost. Local robot vision may also therefore provide robustness by inserting redundancy to handle cases where the central planner fails. For instance, as an automatic pallet jack passes and identifies an object, the pallet jack may send information up to a remote, cloud-based server system. Such information may be used to fix errors in central planning, help to localize robotic devices, or to identify lost objects.

In further examples, a central planning system may dynamically update a map of the physical environment containing robotic fleet 100 and objects undergoing processing by the robotic devices. In some examples, the map may be continuously updated with information about dynamic objects (e.g., moving robots and packages moved by robots). In additional examples, a dynamic map could contain information on both the current configuration or placement of components within a warehouse (or across multiple warehouses) as well as information about what is anticipated in the near term. For instance, the map could show current locations of moving robots and anticipated locations of the robots in the future, which may be used to coordinate activity between robots. The map could also show current locations of items undergoing processing as well as anticipated future locations of the items (e.g., where an item is now and when the item is anticipated to be shipped out).

In additional examples, some or all of the robots may scan for labels on objects at different points within the process. The scans may be used to look for visual tags that may be applied to individual components or specific items to facilitate finding or keeping track of components and items. This scanning may yield a trail of items constantly moving around as the items are manipulated or transported by robots. A potential benefit is added transparency, both on the supplier side and the consumer side. On the supplier side, information about current locations of inventory may be used to avoid overstocking and/or to move items or pallets of items to different locations or warehouses to anticipate demand. On the consumer side, the information about current locations of particular items may be used to determine when a particular package will be delivered with improved accuracy.

In some examples, some or all of the mobile components 110 within robotic fleet 100 may periodically receive charged batteries from a battery exchange station 126 equipped with multiple battery chargers. In particular, the station 126 may replace a mobile robot's old batteries with recharged batteries, which may prevent robots from having to sit and wait for batteries to charge. The battery exchange station 126 may be equipped with a robotic manipulator such as a robotic arm. The robotic manipulator may remove batteries from an individual mobile robot and attach the batteries to available battery chargers. The robotic manipulator may then move charged batteries located at the station 126 into the mobile robot to replace the removed batteries. For instance, an AGV 112 with a weak battery may be controlled to move over to battery exchange station 126 where a robotic arm pulls a battery out from the AGV 112, puts the battery in a charger, and gives the AGV 112 a fresh battery.

In further examples, battery exchanges may be scheduled by a central planning system. For instance, individual mobile robots may be configured to monitor their battery charge status. The robots may periodically send information to the central planning system indicating the status of their batteries. This information may then be used by the central planning system to schedule battery replacements for individual robots within the fleet when needed or convenient.

In some examples, a fleet 100 may contain a number of different types of mobile components 110 that use different types of batteries. A battery exchange station 126 may therefore be equipped with different types of battery chargers for different types of batteries and/or mobile robots. The battery exchange station 126 may also be equipped with a robotic manipulator that can replace batteries for different types of robots. In some examples, mobile robots may have battery containers containing multiple batteries. For instance, an autonomous fork truck 114 such as a pallet jack may have a steel bucket with 3 or 4 batteries. The robotic arm at the station 126 may be configured to lift out the entire bucket of batteries and attach individual batteries to battery chargers on a shelf at the station 126. The robotic arm may then find charged batteries to replace the old batteries, and move those batteries back into the bucket before reinserting the bucket into the pallet jack.

In further examples, global control system 150 and/or a separate control system of the battery exchange station 126 may also automate battery management strategies. For instance, each battery may have a barcode or other identifying mark so that the system can identify individual batteries. A control system of the battery exchange station 126 may count how many times individual batteries have been recharged (e.g., to determine when to change water or empty batteries completely). The control system may also keep track of which batteries have spent time in which robotic devices, how long the batteries took to recharge at the station 126 in the past, and other relevant properties for efficient battery management. This battery usage information may be used by the control system to select batteries for the robotic manipulator to give to particular mobile robots.

In additional examples, a battery exchange station 126 may also involve a human operator in some cases. For instance, the station 126 could include a rig where people can safely perform manual battery changing or deliver new batteries to the station for deployment into the fleet 100 when necessary.

Figure 2A:
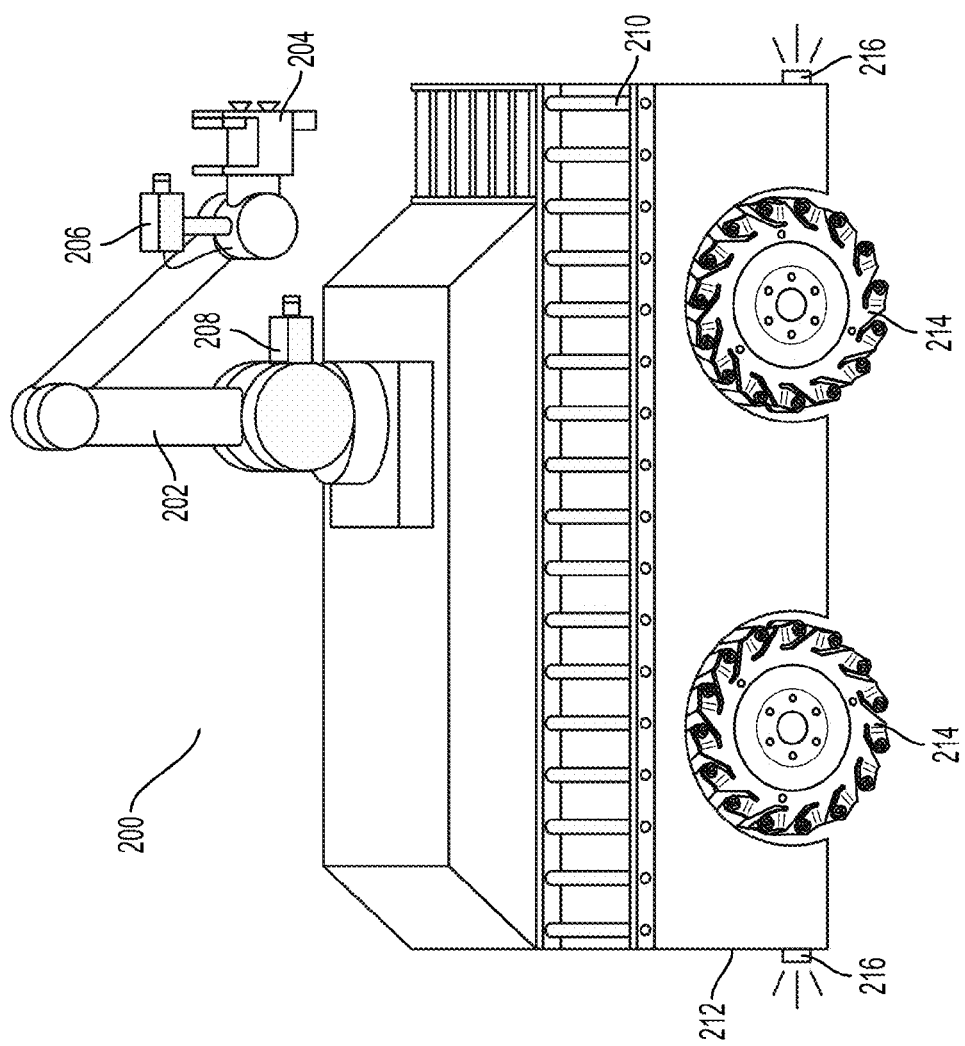
FIG. 2A shows a robotic truck unloader, according to an example implementation.
Figure 2B:
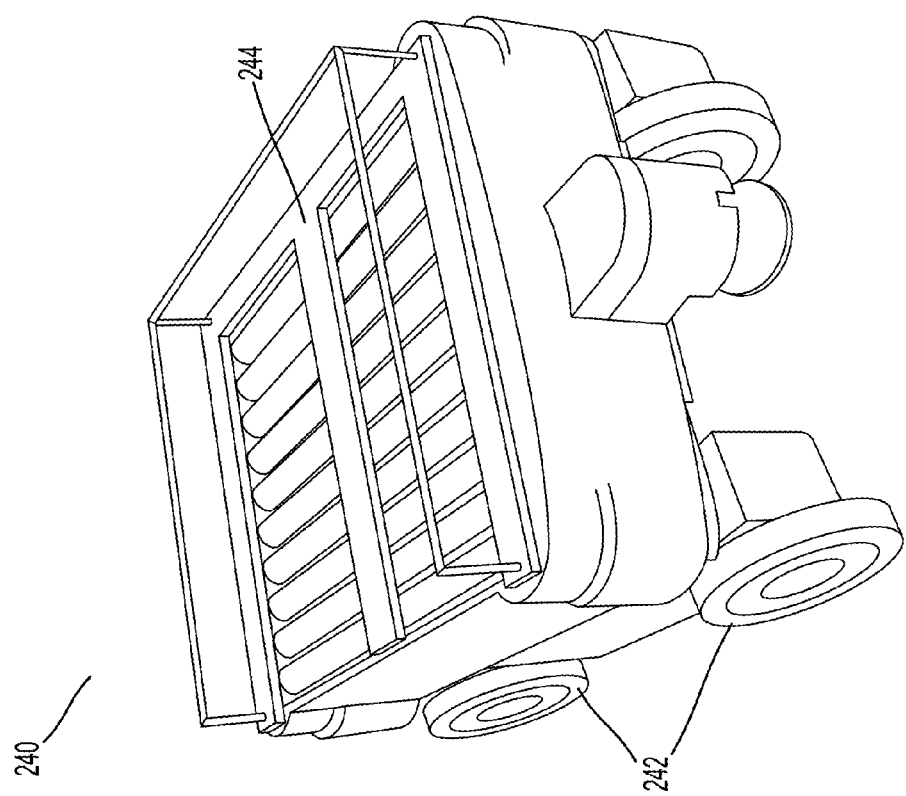
FIG. 2B shows an autonomous guided vehicle, according to an example implementation.
Figure 2C:
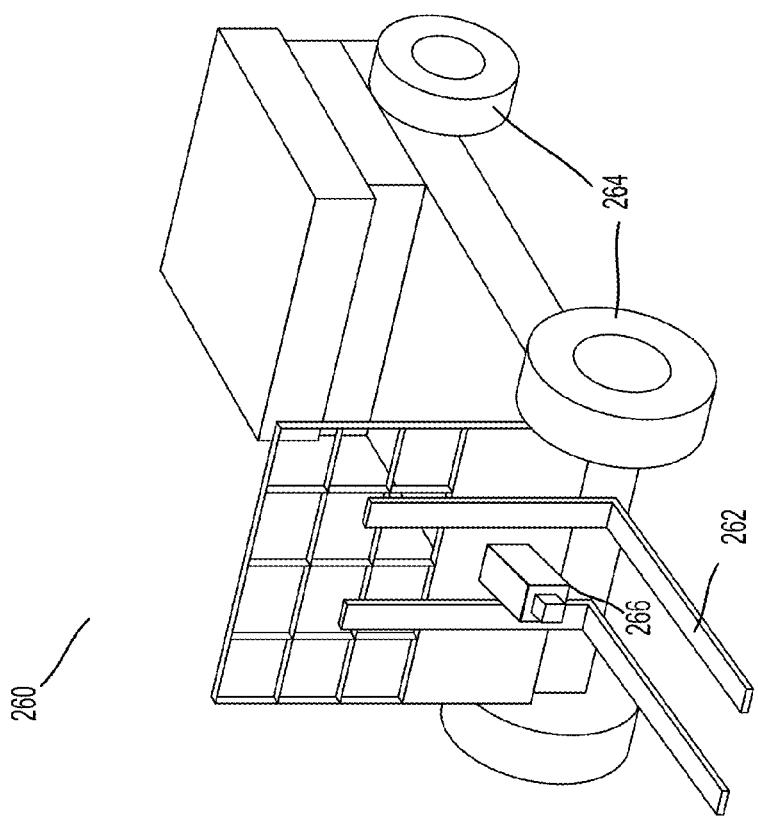
FIG. 2C shows an autonomous fork truck, according to an example implementation.

FIGS. 2A-2C illustrate several examples of robotic devices that may be included within a robotic warehouse fleet. Other robotic devices which vary in form from those illustrated here as well as other types of robotic devices may also be included.

FIG. 2A illustrates a robotic truck unloader, according to an example implementation. In some examples, a robotic truck unloader may include one or more sensors, one or more computers, and one or more robotic arms. The sensors may scan an environment containing one or more objects in order to capture visual data and/or three-dimensional (3D) depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

The robotic truck unloader 200 may include a robotic arm 202 with a gripping component 204 for gripping objects within the environment. The robotic arm 202 may use the gripping component 204 to pick up and place boxes to load or unload trucks or other containers. The truck unloader 200 may also include a moveable cart 212 with wheels 214 for locomotion. The wheels 214 are shown to be mecanum wheels, although other types of wheels are possible as well. Additionally, a wrap around front conveyor belt 210 may be included on the holonomic cart 212. In some examples, the wrap around front conveyer belt may allow the truck loader 200 to unload or load boxes from or to a truck container or pallet without having to rotate gripper 204.

In further examples, a sensing system of robotic truck unloader 200 may use one or more sensors attached to a robotic arm 202, such as sensor 206 and sensor 208, which may be two-dimensional (2D) sensors and/or 3D depth sensors that sense information about the environment as the robotic arm 202 moves. The sensing system may determine information about the environment that can be used by a control system (e.g., a computer running motion planning software) to pick and move boxes efficiently. The control system could be located on the device or could be in remote communication with the device. In further examples, scans from one or more 2D or 3D sensors with fixed mounts on a mobile base, such as a front navigation sensor 216 and a rear navigation sensor 218, and one or more sensors mounted on a robotic arm, such as sensor 206 and sensor 208, may be integrated to build up a digital model of the environment, including the sides, floor, ceiling, and/or front wall of a truck or other container. Using this information, the control system may cause the mobile base to navigate into a position for unloading or loading.

In further examples, the robotic arm 202 may be equipped with a gripper 204, such as a digital suction grid gripper. In such implementations, the gripper may include one or more suction valves that can be turned on or off either by remote sensing, or single point distance measurement and/or by detecting whether suction is achieved. In additional examples, the digital suction grid gripper may include an articulated extension. In some implementations, the potential to actuate suction grippers with rheological fluids or powders may enable extra gripping on objects with high curvatures.

The truck unloader 200 may additionally include a motor, which may be an electric motor powered by electrical power, or may be powered by a number of different energy sources, such as a gas-based fuel or solar power. Additionally, the motor may be configured to receive power from a power supply. The power supply may provide power to various components of the robotic system and could represent, for example, a rechargeable lithium-ion or lead-acid battery. In an example implementation, one or more banks of such batteries could be configured to provide electrical power. Other power supply materials and types are also possible.

FIG. 2B shows an autonomous guided vehicle (AGV), according to an example implementation. More specifically, AGV 240 may be a relatively small, mobile robotic device that is capable of transporting individual boxes or cases. The AGV 240 may include wheels 242 to allow for locomotion within a warehouse environment. Additionally, a top surface 244 of the AGV 240 may be used to places boxes or other objects for transport. In some examples, the top surface 244 may include rotating conveyors to move objects to or from the AGV 240. In additional examples, the AGV 240 may be powered by one or more batteries that can be quickly recharged at a battery charging station and/or exchanged for fresh batteries at a battery exchange station. In further examples, the AGV 240 may additionally include other components not specifically identified here, such as sensors for navigation. AGVs with different shapes and sizes also may be included within a robotic warehouse fleet, possibly depending on the types of packages handled by a warehouse.

FIG. 2C shows an autonomous fork truck, according to an example implementation. More specifically, autonomous fork truck 260 may include a forklift 262 for lifting and/or moving pallets of boxes or other larger materials. In some examples, the forklift 262 may be elevated to reach different racks of a storage rack or other fixed storage structure within a warehouse. The autonomous fork truck 260 may additionally include wheels 264 for locomotion to transport pallets within the warehouse. In additional examples, the autonomous fork truck may include a motor and power supply as well as a sensing system, such as those described with respect to robotic truck unloader 200.

In further examples, a sensing system of the autonomous fork truck 260 may use one or more sensors attached to the body of the fork truck 260, such as sensor 266, which may be two-dimensional (2D) sensor or 3D depth sensor that senses information about the environment as the robotic devices moves in an environment. The sensing system may determine information about the environment that can be used by a control system (e.g., a computer running motion planning software) to pick and move pallets efficiently. The control system could be located on the device or could be in remote communication with the fork truck. In further examples, scans from one or more 2D or 3D sensors with fixed mounts on a mobile base may be integrated to build up a digital model of the environment, including the sides, floor, ceiling, and/or front wall of a truck or other container. Using this information, the control system may cause the fork truck to navigate into a position for lifting pallets.

III. EXAMPLE CONFIGURATION OF A ROBOTIC DEVICE

Figure 3:
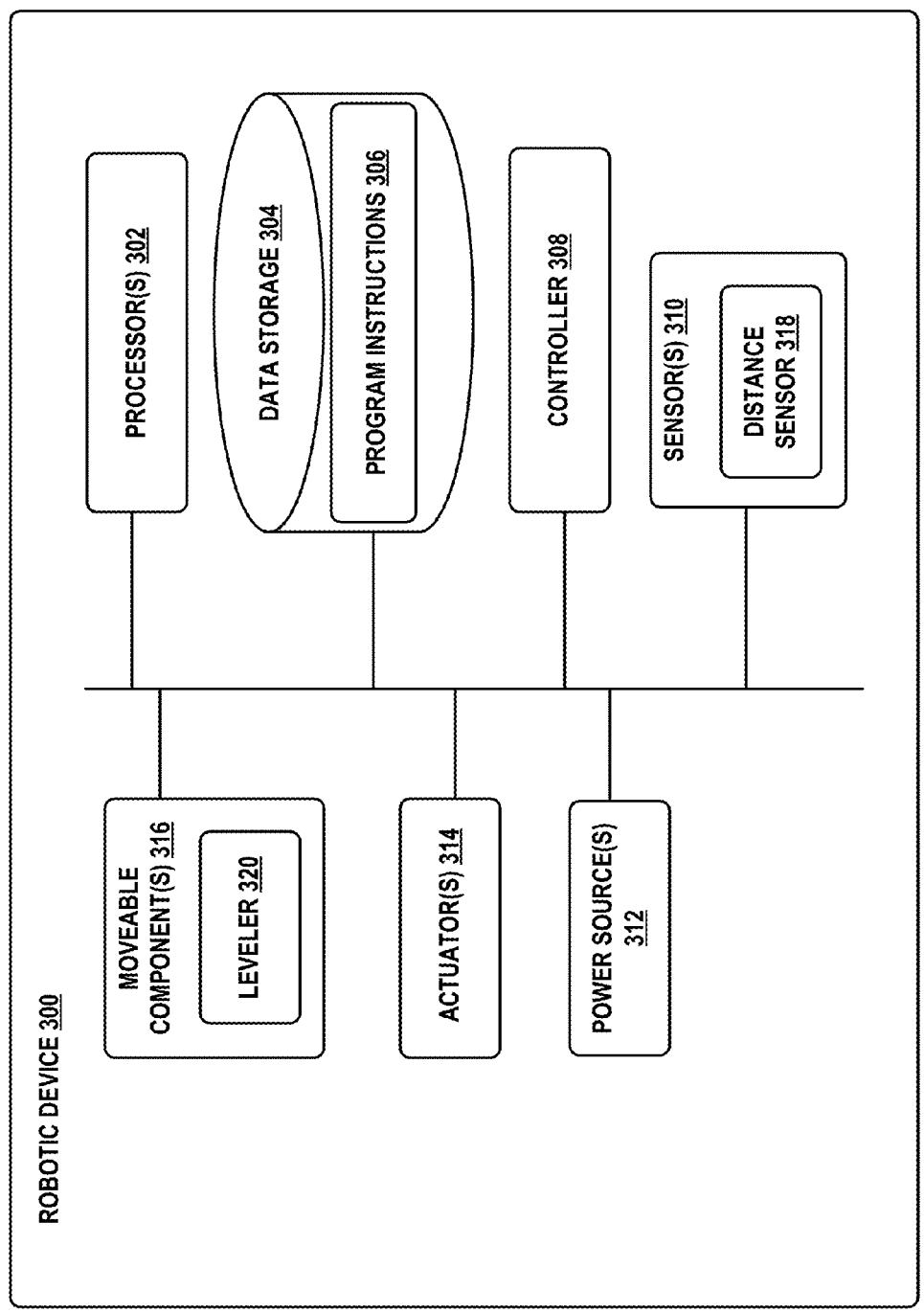
FIG. 3 shows components of a robotic device, according to an example implementation.

FIG. 3 next shows an example configuration of a robotic device 300. Robotic device 300 may be any device that has a computing ability and interacts with its surroundings with an actuation capability. For example, the robotic device 300 may take the form of any one of the above-described devices, such as of a robotic truck unloader 200, an AGV 240, or an autonomous fork truck 260. In other examples, the robotic device 300 could take the form of a humanoid robot, a robotic arm, a quadruped robot, among others. Additionally, the robotic device 300 may also be referred to as a robotic system, a robotic manipulator, or a robot, among others.

The robotic device 300 is shown to include processor(s) 302, data storage 304, program instructions 306, controller 308, sensor(s) 310 (e.g., a distance sensor 318), power source(s) 312, actuator(s) 314, and movable component(s) 316 (e.g., a leveler 320). Note that the robotic device 300 is shown for illustration purposes only and robotic device 300 may include additional components and/or have one or more components removed without departing from the scope of the disclosure. Further, note that the various components of robotic device 300 may be arranged and connected in any manner.

Processor(s) 302 may be a general-purpose processor or a special purpose processor (e.g., digital signal processors, application specific integrated circuits, etc.). The processor(s) 302 can be configured to execute computer-readable program instructions 306 that are stored in the data storage 304 and are executable to provide the functionality of the robotic device 300 described herein. For instance, the program instructions 306 may be executable to provide functionality of controller 308, where the controller 308 may be configured to instruct an actuator 314 to cause movement of one or more movable component(s) 316, among other operations.

The data storage 304 may include or take the form of one or more computer-readable storage media that can be read or accessed by processor(s) 302. The one or more computer-readable storage media can include volatile and/or non-volatile storage components, such as optical, magnetic, organic or other memory or disc storage, which can be integrated in whole or in part with processor(s) 302. In some implementations, the data storage 304 can be implemented using a single physical device (e.g., one optical, magnetic, organic or other memory or disc storage unit), while in other implementations, the data storage 304 can be implemented using two or more physical devices. Further, in addition to the computer-readable program instructions 306, the data storage 304 may include additional data such as diagnostic data, among other possibilities.

The robotic device 300 may include one or more sensor(s) 310 such as force sensors, proximity sensors, load sensors, position sensors, touch sensors, depth sensors, ultrasonic range sensors, infrared sensors, Global Positioning System (GPS) receivers, sonar, optical sensors, biosensors, Radio Frequency identification (RFID) sensors, Near Field Communication (NFC) sensors, wireless sensors, compasses, smoke sensors, light sensors, radio sensors, microphones, speakers, radar, cameras (e.g., color cameras, grayscale cameras, and/or infrared cameras), depth sensors (e.g., Red Green Blue plus Depth (RGB-D), lasers, a light detection and ranging (LIDAR) device, a structured-light scanner, and/or a time-of-flight camera), a stereo camera, motion sensors (e.g., gyroscope, accelerometer, inertial measurement unit (IMU), and/or foot step or wheel odometry), and/or range sensors (e.g., ultrasonic and/or infrared), among others. The sensor(s) 310 may provide sensor data to the processor(s) 302 to allow for appropriate interaction of the robotic device 300 with the environment. Additionally, the robotic device 300 may also include one or more power source(s) 312 configured to supply power to various components of the robotic device 300. Any type of power source may be used such as, for example, a gasoline engine or a battery.

The robotic device 300 may also include one or more actuator(s) 314. An actuator is a mechanism that may be used to introduce mechanical motion. In particular, an actuator may be configured to convert stored energy into movement of one or more components. Various mechanisms may be used to power an actuator. For instance, actuators may be powered by chemicals, compressed air, hydraulics, or electricity, among other possibilities. With this arrangement, actuator(s) 314 may cause movement of various movable component(s) 316 of the robotic device 300. The moveable component(s) 316 may include appendages such as robotic arms, legs, and/or hands, among others. The moveable component(s) 316 may also include a movable base, wheels, and/or end effectors, among others. Further, when a robotic device 300 includes at least one end effector, such an end effector may be a tool and/or a gripper, among others.

In accordance with the present disclosure, the robotic device 300 may also include at least one distance sensor 318. In particular, the distance sensor 318 may be used by the robotic device 300 to determine presence of one or more objects in the environment, to determine respective locations of one or more objects, and/or to respectively identify one or more objects, among other possibilities. In this way, the distance sensor 318 may help the robotic device 300 navigate the environment, avoid obstacles, and/or identify objects to be manipulated, among others.

Generally, the distance sensor 318 may be configured to detect radiation reflected from at least one object in the environment. Also, the distance sensor 318 may be configured to generate a signal that corresponds to the detected radiation and thus produces sensor data indicative of the environment in which the robotic device 300 is operating. The distance sensor 318 may then provide the sensor data to the controller 308 of the robotic device 300. In practice, the sensor data may be in form of distance measurements each specifying a distance between the distance sensor and at least one point on a surface in the environment, among other possibilities. The controller 308 may send the sensor data to a computing device and the computing device may generate, based on the sensor data, a two-dimensional representation of the environment.

Moreover, the source of the detected reflected radiation may be emissions (e.g., electromagnetic radiation) emitted by an emitter of the robotic device 300. In particular, the emitter may emit emissions that are reflected from objects in the environment and then detected by the distance sensor 318 so as to gain data about the environment. In an example arrangement, the emitter may be incorporated as part of a sensor system used for such detection, such as by being incorporated as part of the distance sensor 318 itself. With this arrangement, the distance sensor 318 could thus take the form of a light detection and ranging (LIDAR) sensor, a time-of-flight (ToF) laser sensor, ultrasonic sensor, stereoscopic sensor, visual depth-by-motion sensor, laser or LED triangulation sensing, among others. In other arrangements, however, the emitter may be physically separate from the distance sensor 318. Other arrangements are possible as well.

In some cases, the distance sensor 318 may be a 2D horizontal planar distance sensor. In particular, a 2D distance sensor may be configured to emit emissions that substantially travel along a 2D plane in physical space. Also, the 2D distance sensor may be arranged on the robotic device 300 so as to emit such emissions substantially parallel to a particular plane. In an example, the distance sensor 318 may emit the emissions substantially parallel to a ground surface on which the robotic device 300 is travelling. In another example, the distance sensor 318 may be arranged on the robotic device 300 so as to emit the emissions substantially parallel to the tines of a fork truck. Moreover, the distance sensor 318 may be arranged on the robotic device 300 so as to receive reflected radiation along a substantially parallel plane relative to the ground surface or may be arranged on the robotic device 300 so as to receive reflected radiation along a substantially parallel plane relative to the tines of a fork truck.

Further, the distance sensor 318 may be configured to rotate about a vertical axis (i.e., an axis that passes from top to bottom through the device) when scanning an environment. In particular, the distance sensor 318 may be configured to scan the environment around the vehicle by rotating about the axis continuously while emitting emissions and detecting reflected emissions off of objects in the environment. In some examples, the distance sensor 318 may be configured to rotate 360° about the vertical axis. In other examples, the distance sensor 318 may be configured to rotate 270° degrees about the vertical axis.

Further, the distance sensor 318, based on the configuration and capabilities of the sensor 318, may have a coverage area that it may be configured to scan. Specifically, the coverage area of a distance sensor is the area in the environment to which the emitter of the robotic device 300 directs emissions. The coverage area is relative to the position of the distance sensor 318 at a given moment. Further, the coverage area of the distance sensor 318 may depend on the angle of rotation of the distance sensor 318 about the axis, and may also depend on the distance (from the sensor) from which the distance sensor 318 can receive accurate reflected emissions. The coverage area of a distance sensor 318 may also be referred to as the field-of-view (FOV) of the sensor. For example, the distance sensor 318 may be configured to rotate 270° around the axis, and therefore may have a 270° FOV around the robotic device 300. In some examples, one of the distance sensors 318 may be mounted on a top surface of the robotic device 300, and may be configured to rotate 360° about the vertical axis, which provides the robotic device 300 with a 360° FOV of the environment around the robotic device 300. In the example of a 2D sensor where emissions are sent and received substantially along a horizontal plane, the coverage area of the 2D sensor may also be referred to as a horizontal coverage plane.

IV. EXAMPLE SYSTEM AND METHOD

Figure 4:
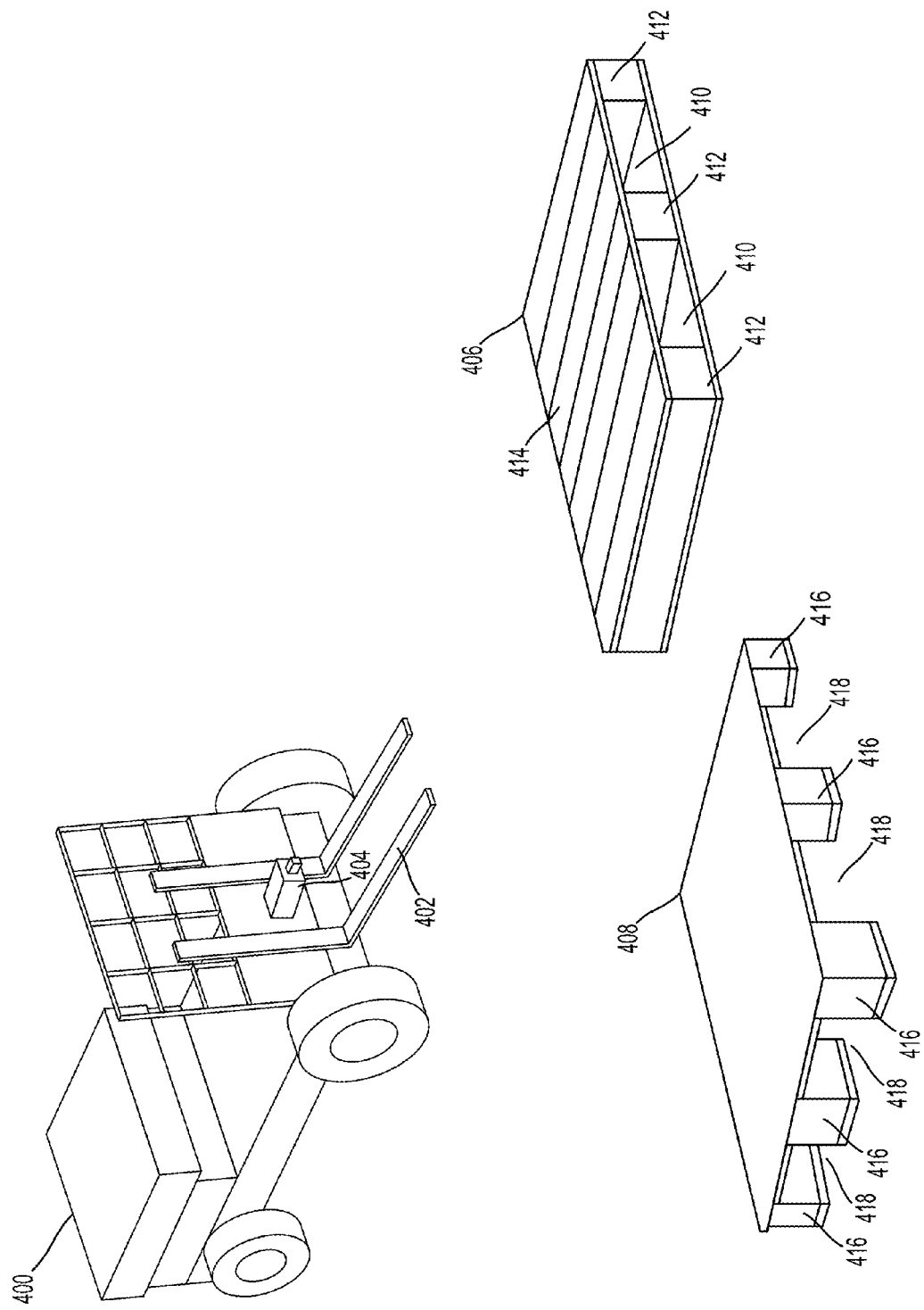
FIG. 4 shows an autonomous fork truck near two pallets, according to an exemplary embodiment.

FIG. 4 illustrates a robotic device 400 deployed in a worksite that includes pallets, according to an exemplary embodiment. The robotic device 400 may be a fork truck that includes two tines 402. Further, a distance sensor 404 may be coupled to the robotic device. As illustrated in FIG. 4, the distance sensor may be coupled to the robotic device above the two tines. However, the distance sensor 404 may be coupled to other areas or components of the robotic device 400. For example, the distance sensor 404 may be placed between the tines of the robotic device. In another example, the distance sensor 404 may be located on a top surface of the robotic device 400. In yet another example, more than one distance sensor may be coupled to the robotic device 400. For instance, a distance sensor may be placed on each tine of the robotic device. Other configurations and number of distance sensors coupled to a robotic device are also possible.

In another example, the distance sensor 404 may be mounted on an adjustable mounting platform that is coupled to the robotic device 400. The adjustable mounting platform may be configured to spatially reorient the distance sensor 404 relative to a particular plane. More specifically, the platform may be any mechanical feature that is directly or indirectly attached to a portion of the robotic device 400 and is movable relative to that portion of the robotic device 400. In practice, the platform may take on any feasible form, may be composed of any feasible material, and may be of any feasible size and shape. Moreover, the platform may be arranged in one of various ways so as to be configured spatially reorient the distance sensor 404 relative to the particular plane. In an example, the platform may be arranged to spatially reorient the distance sensor 404 relative to a plane that is parallel to the ground surface. In another example, the platform may be arranged to spatially reorient the distance sensor 404 relative to a plane that is parallel to the tines 402.

In some embodiments, the distance sensor 404 may be attached at a chosen point on the robotic device 400 in order to scan a particular area with respect to the robotic device 400. For instance, a distance sensor 404 may be used for object detection, and therefore may be placed on an area of the robotic device where the sensors may scan the environment in order to detect objects. In an example embodiment, one or more distance sensors 404 may be coupled to the robotic device 400 in order to at least detect pallets that may be located in the environment. As such, one or more of the distance sensors 404 may be placed at a height at which the sensor may detect features of the pallet that are described herein. In an implementation, one or more of the distance sensors 404 may be mounted between the tines of the robotic truck.

As illustrated in FIG. 4, the worksite in which the robotic device 404 is deployed may include pallets. The worksite may include pallets of different types and/or sizes. The pallets may also be manufactured from different materials (e.g., wood, plastic, etc.). The different pallet types may include a two way entry pallet 406 and a four way entry pallet 408. The two way entry pallet 406 may have two tines pockets on two opposite sides of the pallet 406. FIG. 4 illustrates the two tine pockets 410 from one side of pallet 406. The robotic device 400 may use the tines 402 to lift the pallet from either side that has the pocket tines 410. On the other hand, the four way entry pallet 408 has two tine pockets on each side of the pallet 408. Such an arrangement allows the fork truck 400 to engage any side of the pallet 408 in order to lift the pallet 408.

Further, a pallet (of either type) may include a plurality of support members that support the deckboards onto which boxes are placed. The support members may be elongated support members that span up to a length of the pallet (i.e., the length of the top surface of the pallet). For example, a pallet may comprise three or more parallel stringers with one or more deckboards fixed across the three or more stringers. The pallet 406 is one example of such a pallet. The pallet 406 includes a plurality of deckboards 414 fixed on three parallel stringers 412. The gaps between the parallel stringers may form the tine pockets 410 of the pallet 406. Stringers may be used to manufacture both two way entry and four way entry pallets.

In another example, the support members of a pallet may be a plurality of blocks each of which serve as an individual leg. Pallet 408 is an example of such a pallet. The pallet 408 may include nine blocks (i.e., legs) 416 onto which one or more deckboards are fixed (FIG. 4 illustrates two sides and five legs of the pallet 408). The nine legs may be evenly spaced in a three by three array. In such an arrangement, the pallet 408 may be identical on each side, and may include two pocket tines on each side. Thus, the pallet 408 is a four way entry pallet.

Figure 5:
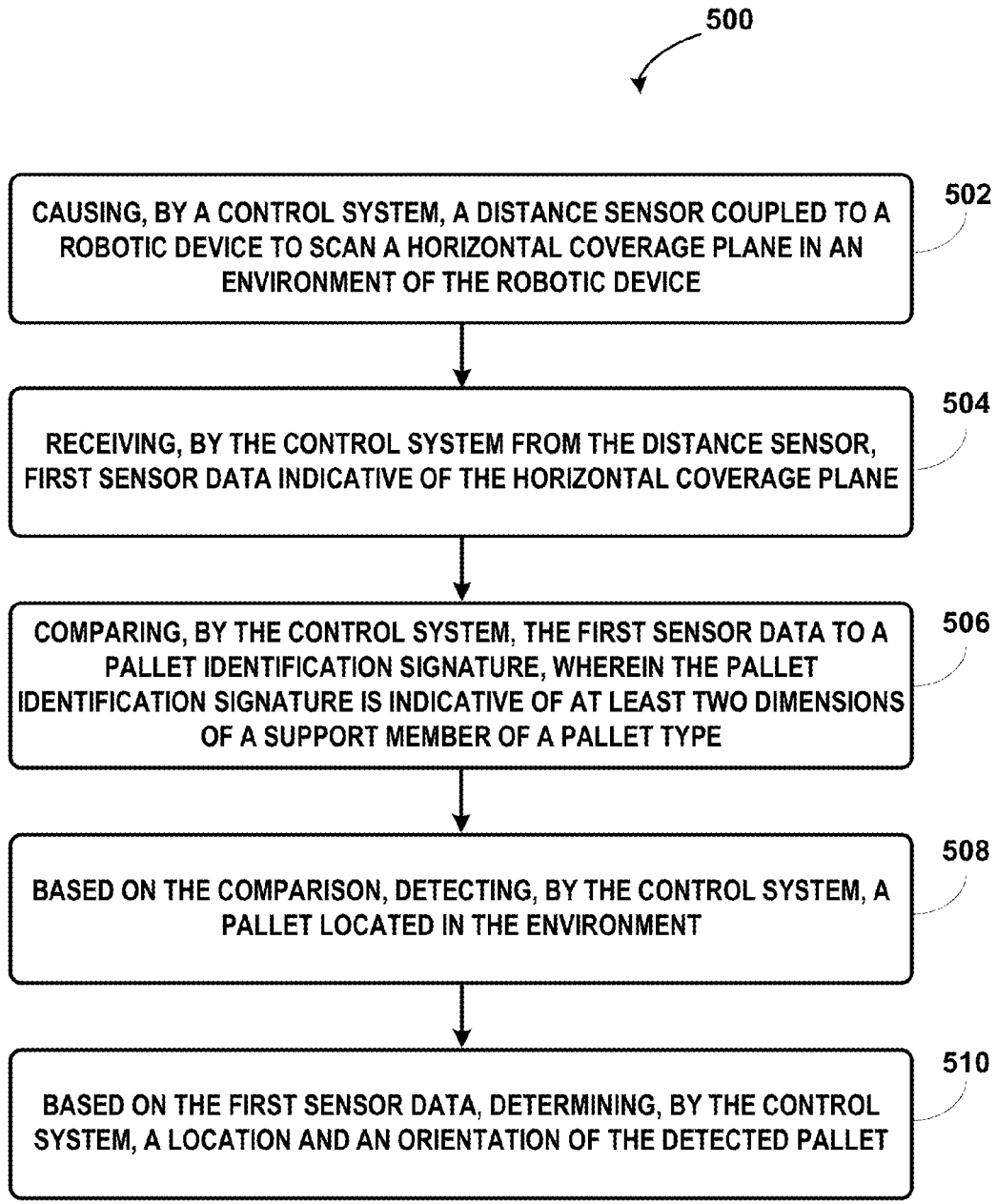
FIG. 5 is a flowchart that shows a method, according to an example implementation.

FIG. 5 is a flowchart illustrating a method 500, according to an example implementation. In particular, the method 500 may be implemented to locate pallets in an environment of a robotic device, such as the robotic device 400 in FIG. 4.

Method 500 shown in FIG. 5 (and other processes and methods disclosed herein) presents a method that can be implemented within an arrangement involving, for example, the robotic device 300 shown in FIG. 3 (or more particularly by components or subsystems thereof, such as by a processor and a non-transitory computer-readable medium having instructions that are executable to cause the device to perform functions described herein). Additionally or alternatively, method 500 may be implemented within any other arrangements and systems.

Method 500 and other processes and methods disclosed herein may include operations, functions, or actions as illustrated by one or more of blocks 502-510. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block in FIG. 5 may represent circuitry that is wired to perform the specific logical functions in the process.

Figure 6A:
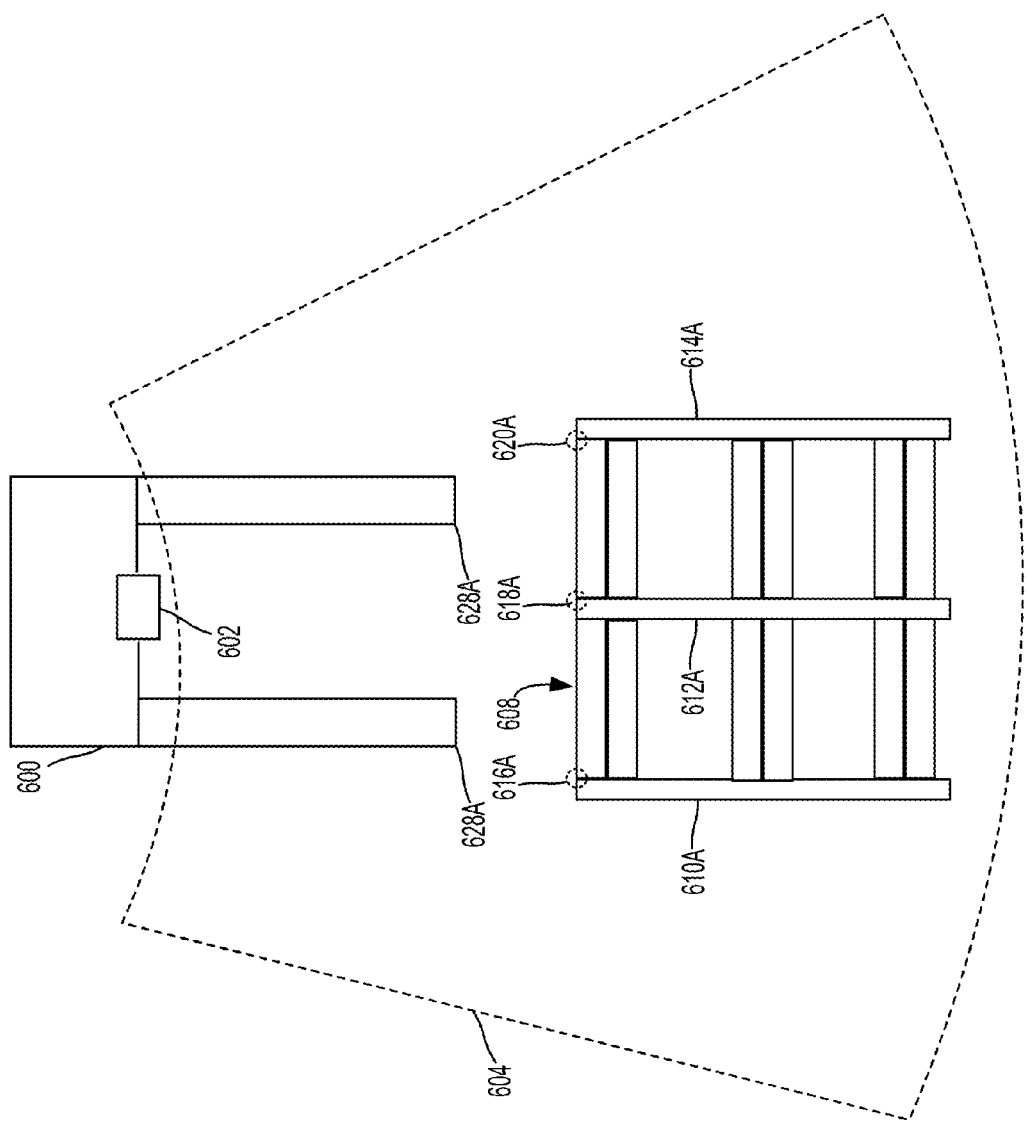
FIG. 6A shows a top view of autonomous fork truck near a pallet, according to an example implementation.

An implementation of the method 500 may be described with respect to FIG. 6A and FIG. 6B. FIG. 6A illustrates a robotic device 600 that may include some or all of the components of the robotic device 300 illustrated in FIG. 3. A controller of the robotic device 600 may perform the steps of the method 500 as described below.

At block 502, the method 500 involves causing, by a control system, a distance sensor coupled to a robotic device to scan a horizontal coverage plane in an environment of the robotic device.

FIG. 6A illustrates the robotic device 600 whose controller may be performing the steps of method 500, according to an example embodiment. The robotic device 600 may be a fork truck 600 that is located in a worksite that includes pallets, such as a pallet 608. Further, the fork truck 600 may include a distance sensor 602 that may be mounted on the robotic device or may be mounted on an adjustable platform. In an embodiment, the distance sensor 602 may be mounted on an area of the robotic device 600 above the robotic device 600's tines 628A. Furthermore, in some embodiments, the distance sensor 602 can be an a single sensor, an array of sensors, or a plurality of sensors.

In an embodiment, the fork truck 600 may be deployed in a worksite in order to move pallets that are located in the worksite. Accordingly, the fork truck 600 may need to precisely locate the pallets in the environment in order to move the pallets. Specifically, the fork truck may need to know the type of a pallet to be moved, the location and the orientation of the pallet, and the location of the features of the pallet (e.g., tine pockets) that may be used to move the pallet, among other possible determinations.

In an embodiment, a coverage plane of the distance sensor 602 may be an area within the dotted coverage plane 604. That is, the FOV of the distance sensor 602 may be a two-dimensional horizontal FOV around the robotic device 600. As further illustrated in FIG. 6A, a pallet 608 may be located within the coverage plane 604 of the robotic device 600. The pallet 608 may be a two way pallet 608 that has pocket tines on two opposite ends. Specifically, the pallet 608 may include three support members 610A, 612A, and 614A. Each of the support members may be a stringer that extends along the length of the pallet 608.

Referring back to FIG. 5, at block 504, the method 500 involves receiving, by the control system from the distance sensor, first sensor data indicative of the horizontal coverage plane. In the context of FIG. 6A, the control system may receive sensor data, from the distance sensor 602, that is indicative of the coverage plane 604. In an embodiment, and as explained above, the data that is received from the distance sensor 602 may be indicative of a distance to one or more points that are indicative of objects located within the coverage plane.

FIG. 6B illustrates distance sensor data 606, according to an exemplary embodiment. The distance sensor data 606 may be indicative of the data that may be collected by the distance sensor 602 that is coupled to the robotic device 600 of FIG. 6A. As illustrated in FIG. 6B, the sensor data 606 may be represented in a two-dimensional graph of the environment. Specifically, the sensor data 606 may include a series of detected points in the environment that are plotted in the two-dimensional graph of the environment. As illustrated in FIG. 6B, the graph may include a horizontal x-axis and a vertical y-axis. Each axis represents a distance along a particular direction (e.g., horizontal or vertical). In example, the units of distance along each axis may be meters. Other units are also possible.

As further illustrated in FIG. 6B, the distance sensor 602 may be located at the origin point in the graph. As such, each point that is represented in the graph is indicative of a distance (in a particular direction) from the distance sensor 602. In some representations of the distance sensor data 606, curve fitting may be used to find a line that best fits one or more adjacent points. Further, in this example, the FOV of the distance sensor 602 is a 270° horizontal FOV around the robotic device. Accordingly, as shown in FIG. 6B, the sensor data 606 includes distance points located 270° around the robotic device.

Referring back to FIG. 5, at block 506, the method 500 involves comparing, by the control system, the first sensor data to a pallet identification signature, wherein the pallet identification signature is indicative of at least two dimensions of a support member of a pallet type.

In reference to FIGS. 6A and 6B, the distance sensor 602 may positioned on the robotic device 600 such that the sensor data 606 that is collected by the distance sensor 602 may be indicative of a feature of a pallet (assuming that a pallet, such as the pallet 608, is located in the coverage area 604 of the distance sensor 602). In an embodiment, the control system may analyze the sensor data 606 in order to determine which of the detected points included in the sensor data 606 are indicative of a feature of a candidate pallet. And once the control system has identified the detected points that are indicative of the candidate pallet, the control system may compare a feature of the candidate pallet to a pallet identification signature to determine whether the candidate pallet corresponds to an actual pallet of a particular type. The control system may then use a location of a detected point respective to the robotic device 600 to determine a location and orientation of the pallet.

In an embodiment, a pallet support member may be a pallet feature that may be used to identify a pallet. That is, the control system could identify where a pallet may be located in an environment by identifying data points in the sensor data that may correspond to a support member of the pallet. In particular, the control system may determine that certain detected points in the sensor data could be indicative of a particular type of a pallet support member (e.g., blocks or stringers), and may then designate those detected points as points that are indicative of a candidate support member of a candidate pallet (i.e., the detected points are possibly indicative of a pallet support member).

Accordingly, in the example illustrated in FIGS. 6A and 6B, the control system may analyze the sensor data 606 in order to determine which of the detected points are indicative of a support member of the pallet 608, and may designate the detected points as corresponding to a candidate support member. The control system may then determine whether the detected data points correspond to a pallet (and not to an object that has a similar shape or features to a support member of the pallet). In particular, the control system may determine whether the candidate support member corresponds to a support member of a pallet by comparing the data indicative of the candidate support member to one or more pallet identification signatures.

In an embodiment, the control system may determine points in the sensor data 606 that are indicative of a candidate support member by analyzing the sensor data 606 and detecting a pattern in the data that may possibly be indicative of a pallet support member. In practice, a robotic device may be facing a pallet at a particular angle, and therefore may not be able to detect all four corners of the support members of the pallet. For example, as illustrated in FIG. 6A, the pallet support member 610 may have two front corners on one side of the pallet 608 and two back corners on the other side the pallet 608. The robotic device 600, when located at the position in FIG. 6A with respect to the pallet 608, may receive sensor data indicative of only certain corners of the pallet support members 610A, 612A, and 614A. Despite detecting only certain corners of the pallet support members of the pallet 608, the control system may determine patterns in the sensor data 606 that may be indicative of at least one of the pallet support members 610A, 612A, and 614A.

In an embodiment, a pattern that may be indicative of a pallet support member may include (i) detected points indicative of at least one corner, and (ii) one or more discontinuities in the detected points that may be indicative of one or more other corners. The sensor data indicative of a corner may include a sequence of detected points that are arranged in the shape of a substantially 90° corner. Alternatively, if the detected points in the sensor data 606 have been curve fitted, the pattern indicative of a corner may be a fitted curve that has a substantially 90° change in slope. Accordingly, the control system may detect the data that is indicative of a corner by detecting a curve in the curve fitted data that has a 90° change in slope. Further, the corner that is detected by the control system by detecting a sequence of points that are arranged in the shape of a substantially 90° corner or by detecting a curve that has a 90° change in slope may be a corner that is fully in the FOV of the one or more distance sensors 602.

In the example of FIGS. 6A and 6B, the control system may analyze the sensor data 606 in order to detect a curve that has a substantially 90° change in slope. Alternatively, the control system may analyze the sensor data 606 to detect a sequence of detected points that are arranged in the shape of a substantially 90° corner. As illustrated in FIG. 6B, the control system may determine that a sequence of detected points 610B includes a plurality of points that are arranged in a shape of a substantially 90° corner, and therefore may determine that the sequence of detected points 610B may be indicative of a first candidate support member. In an example, a detected point 616B may correspond to a portion (edge) of the corner of the first candidate support member.

Further, the control system may detect one or more discontinuities in the sequence of detected points 610B. As explained above, the one or more discontinuities may be indicative of an edge of a corner that one or more distance sensors may not fully detect due to the positioning of a robotic device with respect to a pallet. As the discontinuities may be indicative of other corners of the first candidate member that the sensor data did not fully capture, the control system may be able to determine the dimensions of the first candidate support member based on the location of the discontinuities (i.e., the location of the other corners of the candidate support member).

In the example of FIGS. 6A and 6B, the control system may further analyze the sequence of points 610B and may detect two discontinuities in the sequence of detected points. Specifically, the control system may detect a discontinuity after detected points 624 and 622. Accordingly, the control system may determine that the two points 624 and 622 may be indicative of two corners that are not fully in the FOV of the one or more sensors 602. As illustrated in FIG. 6B, the discontinuity after the detected point 624 may indicate a second front corner of the first candidate support member. The discontinuity after the detected point 622 may be indicative of a back corner of the first candidate support member. Based on the location of the first discontinuity 624, the control system may determine a width of the first candidate support member, and based on the location of the second discontinuity 622, the control system may determine a length of the first candidate support member.

In some examples, the control system may then further analyze the data in order to detect a second candidate support member that may be associated with the first candidate support member (i.e., the first and the second candidate support members are part support members of the same candidate pallet). Similar to detecting the first candidate support member, the control system may detect one or more corners of a second candidate support member in order to determine the dimensions of the second candidate support member. The control system may further determine dimensions of the candidate pallet based on the dimensions of the first and second candidate support members. For example, by determining the distance between the first and the second candidate support members, the control system may determine tine pocket dimensions of the candidate pallet. In the example of FIGS. 6A and 6B, the control system may determine that the sequence of detected points 612B may be indicative of the second candidate support member. The control system may use the determined dimensions of the first candidate support member and the second candidate support member to determine the dimensions of the candidate pallet.

Subsequently, the control system may compare the dimensions of the first candidate support member and/or the second candidate support member to one or more pallet identification signatures in order to determine whether the one or more candidate support members represent one or more support members of a known pallet type. If the dimensions match, the control system may determine that the first and the second candidate support members correspond to support members of a pallet of the pallet type. The control system may have access to a library of pallet identification signatures that may be stored locally on a computing device that runs the control system and/or may be stored in a database to which the computing device may have access (e.g., an online database).

In an embodiment, a pallet signature may specify features of a particular pallet type. For instance, a pallet identification signature may be indicative of the features of a two way pallet or a four way pallet. The pallet signature may further indicate the dimensions of the pallet type. For example, the pallet signature may indicate a height of the pallet, a length of the pallet, a number of legs of the pallet, a width of the tine pockets of the pallet, a number of the tine pockets, etc. In some examples, the pallet identification signature may also identify the dimensions of each support member of a particular pallet type. Other dimensions and features may be calculated from the dimensions included in the pallet identification signature. For example, the distance between two support members of a pallet type may be calculated based on the dimensions of the pallet and the dimensions of the support members.

In an embodiment, comparing, by the control system, the first sensor data to one or more pallet identification signatures may include comparing the dimensions of one or more candidate support members to the dimensions of the support members specified by one or more pallet identification signatures.

Referring back to FIG. 5, at block 508, method 500 involves based on the comparison, detecting, by the control system, a pallet located in the environment. If there is a match between the dimensions of the one or more candidate support members and the dimensions of a pallet type of a pallet identification signature, the control system may determine that the one or more candidate support members correspond to the support members of a pallet located in the environment. For example, in reference to FIGS. 6A and 6B, the control system may compare the sequences of detected points representative of candidate support members to one or more pallet identification signatures. The dimensions of the candidate pallet indicated by the candidate support members may match the dimensions of a first pallet type. Accordingly, the control system may determine that the sequence of points 610A corresponds to the pallet support member 610A, that the sequence of detected points 612B corresponds to the pallet support member 612A of the pallet 608, and that a sequence of detected points 614B corresponds to the pallet support member 614A. The control system may further determine that the detected points 616B, 618B, and 620B may respectively correspond to the corners 616A, 618A, and 620A of the pallet 608.

At block 510, method 500 involves based on the first sensor data, determining, by the control system, a location and an orientation of the detected pallet. The control system may determine the location and the orientation of the detected pallet based on the location of the detected corners and discontinuities in the sensor data. Further, the control system may use the determined pallet type to determine the location of the features of the pallet. For example, in reference to FIGS. 6A and 6B, the control system may determine the location of the tine pockets of the pallet 608, based on the determined dimensions of the pallet 608 and/or the determination that the pallet 608 is a two way pallet.

Once the control system has determined the location and orientation of the pallet 608, the control system may accurately determine where to position the robotic device 600 in order for the robotic device 600 to pick up the pallet 608 using tines 628A of the robotic device 600.

In some embodiments, the control system may also use the sensor 606 to detect objects in the environment other than the pallet 608. For instance, as illustrated in FIG. 6B, the sensor data may include two sets of points 628B that are parallel to one another. The control system may determine that the points 628B correspond to the tines 628A of the robotic device 600. The determination may be based on the location of the detected points 628B with respect to the one or more sensors 602. The determination may also be based on the shape that is outlined by the detected points 628B. In some examples, the control system may have access to identification signatures for objects other than pallets. Accordingly, the control system may determine that the points 628B correspond to the tines 628A based on a comparison of the points 628B to tine identification signatures. Note that the sensor data 606 included data points indicative of the tines 628A since, in this example, the one or more sensors 602 are positioned above the tines 628A.

Figure 7A:
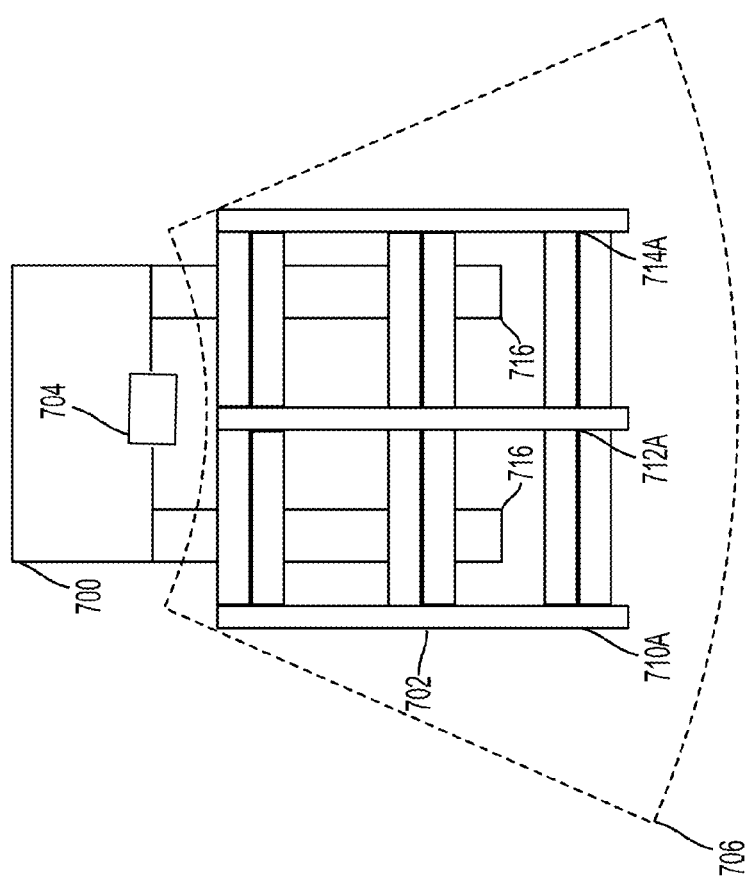
FIG. 7A shows a top view of an autonomous fork truck lifting a pallet, according to an exemplary embodiment.

FIG. 7A illustrates a robotic device 700 that has inserted its tines 716 into tine pockets of a pallet 702, according to an exemplary embodiment. In an embodiment, the control system of the robotic device 700 may use a distance sensor 704 of the robotic device 700 to determine the positioning of the tines 716 with respect to the pallet 702. As explained above, the distance sensor 704 may be oriented such that a coverage plane 706 of the distance sensor 704 is parallel to the tines 716.

Figure 7B:
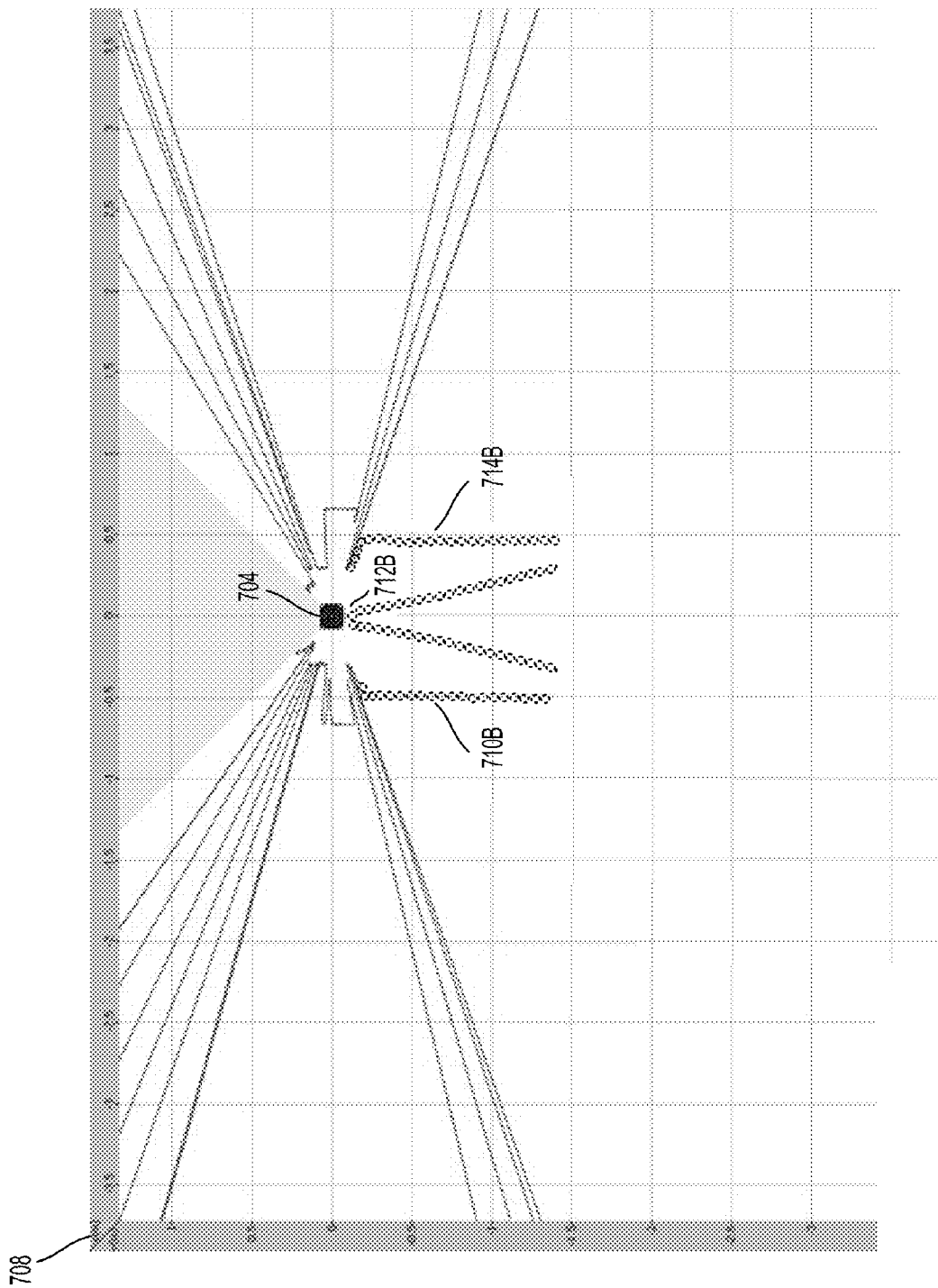
FIG. 7B shows additional two-dimensional distance sensor data, according to an example implementation.

FIG. 7B illustrates sensor data 708 received from the distance sensor 704, according to an exemplary embodiment. In an embodiment, the control system of the robotic device 700 may analyze the sensor data 708 in order to determine the positioning of the tines 716 with respect to the pallet 702. Specifically, the control system may analyze the sensor data 708 in order to determine a location of the pallet 702 in the environment, and may then determine the positioning of the tines 716 with respect to the position of the pallet 702 in the environment. As illustrated in FIG. 7A, the pallet 702 may include support members 710A, 712A, and 714A.

In an embodiment, the control system may determine the location of the pallet 702 (with respect to the tines 716) by determining a location of one or more of the pallet support members 710A, 712A, and 714A. For example, the control system may analyze the sensor data 708 in order to detect one more corners of one or more support members of the pallet 702. Specifically, the control system may detect at least one corner that is facing the distance sensor 704. As explained above, the control system may detect a corner of a support member by detecting a sequence of points that are arranged in a shape of a substantially 90° corner. Further, the control system may detect a back corner of a support member by detecting a discontinuity in the detected points.

As the approximate location of the pallet 702 is known to the control system, the control system may determine to which support member each of the detected corners corresponds. Further, the control system may detect a back corner of one or more of the support members of the pallet 702. The control system may detect a back corner by detecting a discontinuity in the sequence of points that are indicative of a particular support member. Determining the back corner may allow the control system to determine the dimensions of the pallet 702 based on the location of the front corner and the back corner of one or more of the support members.

For example, the control system may detect that a sequence of detected points in the sensor data 708 are indicative of the support member 710A by detecting a corner near an approximate location of the pallet support member 710A. By detecting the corner, the control system may determine the location of the front side of the support member 710A. The sequence of points that is indicative of the support member 710A is depicted in FIG. 7B as sequence of points 710B. Similarly, the control system may detect respective sequences of points that correspond to each of the support members 712A and 714A. The sequence of points 712B and 714B correspond to the support members 712A and 714A respectively.

Based on the determined location of the one or more pallet support members, the control system may determine the location of the pallet 702. By accurately determining the location of the pallet 702, the control system may determine whether the tines 716 are positioned properly with respect to the pallet 702 in order to lift the pallet 702. If the control system determines that the tines 716 are not positioned properly, the control system may determine an adjustment to the positioning of the tines in order to position the tines in a proper position at which the robotic device may lift the pallet. The control system may then cause the robotic device 700 to reposition such that the tines 716 are positioned at the adjusted positioning with respect to the pallet 702.

As explained above, a robotic device may include one or more distance sensors that can be used to detect objects (e.g. pallets) in the robotic device's environment. As also explained above, each of the one or more distance sensors may be mounted on different areas of the robotic device, and may be mounted in different orientations.

In an embodiment, a distance sensor may be placed below tines of a robotic device. In another embodiment, a distance sensor may be placed directly onto each of the tines of the robotic device. In such an embodiment, the distance sensor may be placed on a part of the tines where the distance sensor may not be damaged when lifting a pallet. In yet another embodiment, a distance sensor may be placed between the between the tines of the robotic device. In yet another embodiment, a distance sensor may be placed above the tines.

In some embodiments, the robotic device may include other types of sensors in addition to a distance sensor. The additional sensors may be 1D, 2D, or 3D sensors that may be used for pallet detection. For example, the robotic device may include a distance sensor and one or more monocular cameras. The control system may use a combination of sensor data from the distance sensor and sensor data from the monocular cameras to detect a pallet signature in the environment. The data of the monocular camera may be a 2D image of the environment. In an embodiment, the control system may use the distance sensor data to detect a pallet signature (using the method disclosed herein), and may use the monocular camera as a backup confirmation sensor. The monocular camera may also include failsafe protection and image collection to help develop visual models of pallets.

The distance sensor and the monocular camera may be mounted on the robotic device within close proximity to one another. Further, the sensors may be oriented in a horizontal coplanar orientation. Alternatively, the sensors may be oriented in a vertical coplanar orientation.

In another embodiment, a pair of monocular cameras may be mounted on a backrest of a forklift of the robotic device.

The pair of monocular cameras may be orientated such that the coverage areas of the cameras cover a front edge of a pallet that may be located in front of the robotic device. The pair of monocular cameras may be used for pallet detection, but may also be used to detect if a pallet shifted during transit, to avoid collisions, and upon placement of a pallet, to verify that there is nothing occupying the space where the pallet is to be placed.

In another embodiment, the control system may cause the orientation of the sensors of the robotic device to change as the robotic device goes through different stages of moving a pallet. For example, the pair of monocular cameras may be orientated in towards a first direction towards a height that corresponds to a height of a pallet. In such an orientation, the monocular cameras may provide the control system with supplemental data that the control may use, in addition to the distance sensor data, to detect a pallet. Once the pallet has been picked up, the orientation of the monocular cameras may change to an orientation in which the cameras may be used for obstacle detection.

In another embodiment, a distance sensor, in addition to the horizontally orientated distance sensor, may be mounted on the robotic device in a manner to provide a vertical scanning plane. Such a vertically oriented distance sensor may be used to provide some measure of assurance that nothing is below the tines when they are lowering a pallet. Additionally and/or alternatively, the vertically oriented sensor may also be used to look for clearance or obstructions at the tine tips.

In another embodiment, a 3D sensor may be mounted on the robotic device. For example, a 3D LIDAR sensor may be used in addition to the 2D distance sensors for pallet detection. In another example, a stereoscopic sensor may be used in addition to the 2D distance sensors for pallet detection. In yet another embodiment, one or more sensors, such as proximity or ultrasonic sensors, may be placed within the tines of the robotic device. Such sensors may be used to determine whether the tines have been properly inserted into the tine pockets of a pallet. The sensors may also be used to provide data on the orientation of the pallet as the robotic device moves the pallet from one location to another.

V. CONCLUSION

The present disclosure is not to be limited in terms of the particular implementations described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example implementations described herein and in the figures are not meant to be limiting. Other implementations can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other implementations can include more or less of each element shown in a given figure. Further, some of the illustrated elements can be combined or omitted. Yet further, an example implementation can include elements that are not illustrated in the figures.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

The invention claimed is:

1. A method comprising:
    causing, by a control system, a distance sensor coupled to a robotic device to scan a horizontal coverage plane in an environment of the robotic device;
    receiving, by the control system from the distance sensor, first sensor data indicative of the horizontal coverage plane;
    comparing, by the control system, the first sensor data to a pallet identification signature, wherein the pallet identification signature is indicative of at least two dimensions of a support member of a pallet type;
    based on the comparison, detecting, by the control system, a pallet located in the environment; and
    based on the first sensor data, determining, by the control system, a location and an orientation of the pallet.

2. The method of claim 1, wherein the first sensor data comprises a plurality of curves in a two-dimensional representation of the environment, wherein each of one or more points along each of the curves is indicative of a horizontal distance to a surface in the environment.

3. The method of claim 2, wherein comparing, by the control system, the first sensor data to the pallet identification signature comprises:
    detecting a first corner pattern in a first curve using the first sensor data, wherein a corner pattern comprises a substantially 90 degree change in a slope of a line, and wherein the first corner pattern is indicative of a first corner of a first candidate support member;
    detecting a first discontinuity and a second discontinuity in the first curve using the first sensor data, wherein the first discontinuity and the second discontinuity are indicative of a second corner and a third corner of the first candidate support member respectively;
    based on respective locations of each of the first corner, the second corner, and the third corner, determining (i) a width of the first candidate support member, and (ii) a length of the first candidate support member; and
    comparing the length and the width to the at least two dimensions of the support member indicated by the pallet signature.

4. The method of claim 3, wherein detecting, by the control system, the pallet located in the environment comprises:
    determining that the length and the width correspond to the at least two dimensions of the support member of the pallet type indicated by the pallet signature.

5. The method of claim 3, wherein comparing, by the control system, the first sensor data to the pallet identification signature further comprises:

determining a second corner pattern in a second curve, wherein the second corner pattern is indicative of a first corner of a second candidate support member;

analyzing the first sensor data to determine a first discontinuity and a second discontinuity in the second curve, wherein the first discontinuity and the second discontinuity in the second curve are indicative of a second corner and a third corner of the second candidate support member respectively;

based on respective locations of each of the first corner, the second corner, and the third corner of the second candidate support member, determining a location of the second support member; and determining a distance between the second candidate support member and the first candidate support member.

6. The method of claim 5, wherein based on the comparison, detecting, by the control system, a pallet located in the environment comprises:

determining that the distance between the first candidate support member and the second candidate support member corresponds to a pallet pocket width of the pallet type; and determining that the first candidate support member and the second candidate support member are support members of the pallet.

7. The method of claim 1, wherein detecting a pallet located in the environment further comprises determining the pallet type of the detected pallet, wherein the pallet type is indicative of: (i) a number of the at least one physical support feature of the detected pallet, (ii) dimensions of the detected pallet, and (iii) a number and location of tine openings of the detected pallet.

8. The method of claim 7, wherein the control system determining a location and orientation of the detected pallet in the environment is further based on the pallet type of the detected pallet, and wherein determining the orientation of the pallet comprises estimating a six degree of freedom (DOF) pose of the detected pallet.

9. The method of claim 1, wherein the robotic device is a forklift robotic device comprising two tines, wherein the horizontal coverage plane is parallel to the two tines, and wherein the method further comprises:

operating the robotic device to insert each of the two tines into a respective tine pocket;

after inserting the tines, receiving from the distance sensor, second sensor data comprising a plurality of curves in a two-dimensional map of the environment, wherein each of one or more points along each curve is indicative of a respective horizontal distance to one or more surfaces in the environment;

analyzing the second sensor data to detect a first corner pattern in a first curve, wherein the first corner pattern comprises a substantially 90 degree change in a slope of the first curve, and wherein the first corner pattern is indicative of a front corner of the detected pallet;

analyzing the second sensor data to detect an inflection point in the first curve, wherein the inflection point is indicative of a back corner of the detected pallet; and based on a location of the front corner and a location of the back corner of the support member, determining a positioning of the tines with respect to the pallet.

10. The method of claim 9, the method further comprising:

based on the positioning of tines with respect to the pallet, determining an adjustment to center the tines within the tine pockets; and responsively adjusting the tines.

11. A robotic device comprising:
a distance sensor coupled to the robotic device;
two tines; and
a control system operable to:
cause the distance sensor coupled to a robotic device to scan a horizontal coverage plane in an environment of the robotic device;
receive from the planar distance sensor, first sensor data indicative of the horizontal coverage plane;
compare the first sensor data to a pallet identification signature, wherein the pallet identification signature is indicative of at least two dimensions of a support member of a pallet type;
based on the comparison, detect a pallet located in the environment; and
based on the first sensor data, determine a location and an orientation of the detected pallet.

12. The robotic device of claim 11, further comprising a second planar sensor, and wherein each of the two planar sensors is mounted on a respective tine of the two tines.

13. The robotic device of claim 11, wherein the distance sensor is a light detection and ranging (LIDAR) sensor, and wherein the method further comprises causing the LIDAR sensor to scan the horizontal coverage plane by rotating about an axis perpendicular to a plane of motion of the robotic device.

14. The robotic device of claim 13, wherein the LIDAR sensor rotates 270 degrees about the axis, and wherein the horizontal coverage plane comprises a 270-degree horizontal field-of-view (FOV) around the robotic device.

15. The robotic device of claim 11, further comprising:
an adjustable mounting plate coupled to the robotic device, wherein the planar sensor is mounted onto the adjustable mounting plate, and wherein the mounting plate is configured to adjust the positioning of the planar sensor such that the horizontal coverage plane is parallel to the two tines.

16. The robotic device of claim 11, wherein the first sensor data comprises a plurality of curves in a two-dimensional representation of the environment, wherein each of one or more points along each curve is indicative of a respective horizontal distance to one or more surfaces in the environment.

17. The robotic device of claim 16, wherein the control system further is operable to:

detect a first corner pattern in a first curve using the first sensor data, wherein a corner pattern comprises a substantially 90 degree change in a slope of a curve, and wherein the first corner pattern is indicative of a first corner of a first candidate support member;

detect a first discontinuity and a second discontinuity in the first curve, wherein the first discontinuity and the second discontinuity are indicative of a second corner and a third corner of the first candidate support member respectively;

based on a location of each of the first corner, the second corner, and the third corner, determine (i) a width of the first candidate support member, and (ii) a length of the first candidate support member; and compare the length and width to the at least two dimensions of the support member indicated of the pallet type indicated by the pallet signature.

18. The robotic device of claim 17, wherein the control system further is operable to:

determine that the length and the width correspond to the at least two dimensions of the support member of the pallet type indicated by the pallet signature.

19. The robotic device of claim 11, wherein the control system is further operable to:

cause the robotic device to insert each of the two tines into a respective tine pocket;

receive from the distance sensor second sensor data comprising a plurality of curves in a two-dimensional map of the environment, wherein each of one or more points along each curve is indicative of a respective horizontal distance to one or more surfaces in the environment;

detect a first corner pattern in a first curve using the second sensor data, wherein the first corner pattern comprises a substantially 90 degree change in a slope of the first curve, and wherein the first corner pattern is indicative of a front corner of the detected pallet;

detect an inflection point in the first curve, wherein the inflection point is indicative of a back corner of the detected pallet; and based on a location of the front corner and a location of the back corner, determine a positioning of the tines with respect to the detected pallet.

20. A non-transitory computer readable medium having stored therein instructions executable by one or more processors to perform functions comprising:

causing a distance sensor coupled to a robotic device to scan a horizontal coverage plane in an environment of the robotic device;

receiving from the distance sensor, sensor data indicative of the horizontal coverage plane;

comparing the sensor data to a pallet identification signature, wherein the pallet identification signature is indicative of at least two dimensions of a support member of a pallet type;

based on the comparison, detecting a pallet located in the environment; and based on the sensor data, determining a location and an orientation of the detected pallet.

* * * * *